(12) United States Patent
Wilcox et al.

(10) Patent No.: US 10,042,106 B2
(45) Date of Patent: Aug. 7, 2018

(54) OUTDOOR AND/OR ENCLOSED STRUCTURE LED LUMINAIRE

(71) Applicant: CREE, INC., Durham, NC (US)

(72) Inventors: Kurt S. Wilcox, Libertyville, IL (US); Nicholas W. Medendorp, Jr., Raleigh, NC (US); Brian Kinnune, Racine, WI (US); Gary David Trott, Eatonton, GA (US); Mario A. Castillo, New Braunfels, TX (US); Peter Lopez, Cary, NC (US); S. Scott Pratt, Cary, NC (US); Mark Dixon, Morrisville, NC (US); William L. Dungan, Cary, NC (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 15/443,818

(22) Filed: Feb. 27, 2017

(65) Prior Publication Data

US 2017/0168221 A1    Jun. 15, 2017

Related U.S. Application Data

(60) Division of application No. 14/671,512, filed on Mar. 27, 2015, now Pat. No. 9,581,750, and a continuation-in-part of application No. 13/842,521, filed on Mar. 15, 2013, now Pat. No. 9,519,095, application No. 15/443,818, which is a
(Continued)

(51) Int. Cl.
*G02B 6/26* (2006.01)
*F21V 8/00* (2006.01)
*F21K 9/61* (2016.01)
*F21W 131/10* (2006.01)
(Continued)

(52) U.S. Cl.
CPC .............. *G02B 6/0038* (2013.01); *F21K 9/61* (2016.08); *G02B 6/003* (2013.01); *G02B 6/0031* (2013.01); *G02B 6/0046* (2013.01); *G02B 6/0078* (2013.01); *G02B 6/0093* (2013.01); *F21W 2131/10* (2013.01); *F21W 2131/103* (2013.01); *F21Y 2115/10* (2016.08)

(58) Field of Classification Search
None
See application file for complete search history.

(56) References Cited

U.S. PATENT DOCUMENTS 6,802,628 B2 * 10/2004 Kuo ..................... G02B 6/0021
362/224
7,967,477 B2 * 6/2011 Bloemen ................ F21V 5/045
362/217.04
(Continued)

*Primary Examiner* — Sung Pak
(74) *Attorney, Agent, or Firm* — McDermott Will & Emery LLP

(57) ABSTRACT

A luminaire with a plurality of optical waveguides disposed in side-by-side relationship, together at least partially defining a closed path, and a plurality of optical coupling portions disposed adjacent to the optical waveguides. Further, each optical coupling portion is associated with one of the optical waveguides, and each coupling portion includes a refractive portion and a pair of reflective portions disposed on opposite sides of the refractive portion. Additionally, at least one LED is associated with each optical coupling portion and disposed at a first end of the associated optical coupling portion.

19 Claims, 34 Drawing Sheets

Related U.S. Application Data continuation-in-part of application No. 13/839,949, filed on Mar. 15, 2013, now Pat. No. 9,581,751, and a continuation-in-part of application No. 13/840,563, filed on Mar. 15, 2013, said application No. 14/671,512 is a continuation-in-part of application No. 13/938,877, filed on Jul. 10, 2013, now Pat. No. 9,389,367, application No. 15/443,818, which is a continuation-in-part of application No. 14/101,086, filed on Dec. 9, 2013, now Pat. No. 9,690,029, said application No. 14/671,512 is a continuation-in-part of application No. 14/101,099, filed on Dec. 9, 2013, now Pat. No. 9,411,086, application No. 15/443,818, which is a continuation-in-part of application No. 14/101,129, filed on Dec. 9, 2013, said application No. 14/671,512 is a continuation-in-part of application No. 14/101,051, filed on Dec. 9, 2013, now Pat. No. 9,366,396, application No. 15/443,818, which is a continuation-in-part of application No. PCT/US2014/013937, filed on Jan. 30, 2014, and a continuation-in-part of application No. PCT/US2014/013931, filed on Jan. 30, 2014, and a continuation-in-part of application No. PCT/US2014/030017, filed on Mar. 15, 2014, and a continuation-in-part of application No. 14/462,426, filed on Aug. 18, 2014, said application No. 14/671,512 is a continuation-in-part of application No. 14/462,391, filed on Aug. 18, 2014, now Pat. No. 9,513,424, said application No. 15/443,818 is a continuation-in-part of application No. 14/462,322, filed on Aug. 18, 2014, now Pat. No. 9,632,295, said application No. 14/671,512 is a continuation-in-part of application No. 14/292,778, filed on May 30, 2014, now Pat. No. 9,366,799, application No. 15/443,818, which is a continuation-in-part of application No. 14/485,609, filed on Sep. 12, 2014, now Pat. No. 9,952,372, said application No. 14/671,512 is a continuation-in-part of application No. 14/577,730, filed on Dec. 19, 2014, now abandoned, application No. 15/443,818, which is a continuation-in-part of application No. 14/583,415, filed on Dec. 26, 2014, said application No. 14/671,512 is a continuation-in-part of application No. 14/583,415, filed on Dec. 26, 2014.

(60) Provisional application No. 62/025,905, filed on Jul. 17, 2014, provisional application No. 62/025,436, filed on Jul. 16, 2014, provisional application No. 62/005,965, filed on May 30, 2014, provisional application No. 61/922,017, filed on Dec. 30, 2013, provisional application No. 62/005,955, filed on May 30, 2014, provisional application No. 62/009,039, filed on Jun. 6, 2014.

(51) Int. Cl.
   *F21W 131/103* (2006.01)
   *F21Y 115/10* (2016.01)

(56) References Cited

U.S. PATENT DOCUMENTS

| | | | |
|---|---|---|---|
| 8,434,892 B2* | 5/2013 | Zwak | G02B 6/0018 362/235 |
| 2012/0069575 A1* | 3/2012 | Koh | G02B 6/0021 362/296.01 |
| 2014/0355297 A1* | 12/2014 | Castillo | G02B 6/0035 362/582 |
| 2014/0355302 A1* | 12/2014 | Wilcox | G02B 6/0031 362/609 |
| 2015/0055371 A1* | 2/2015 | van de Ven | G02B 6/0021 362/612 |

* cited by examiner

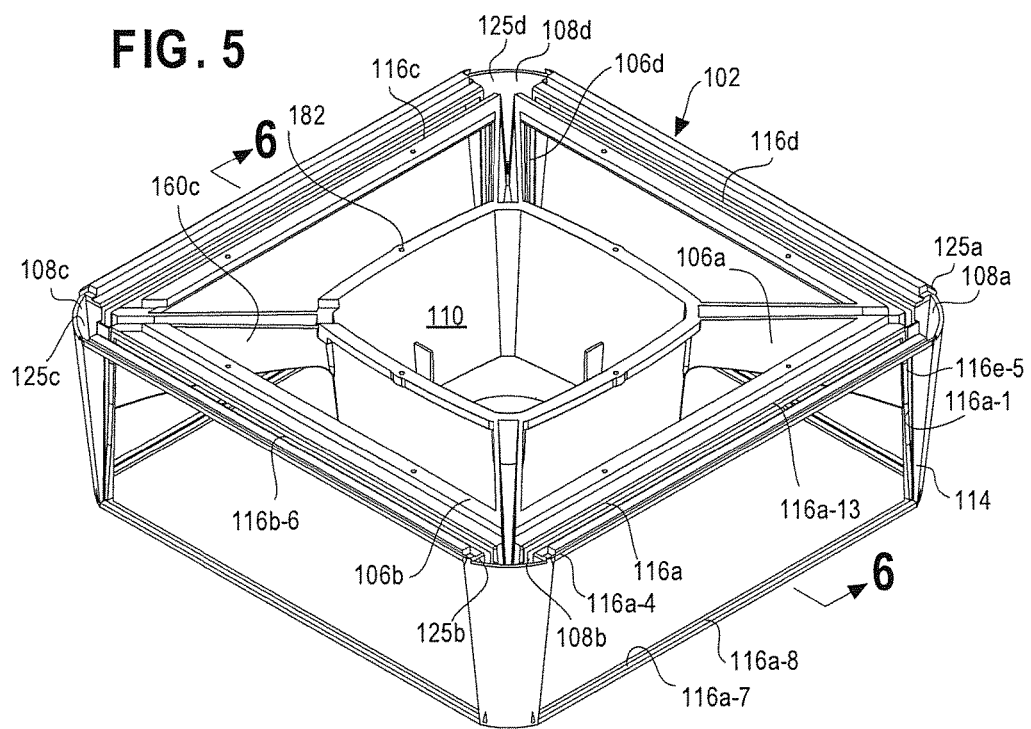
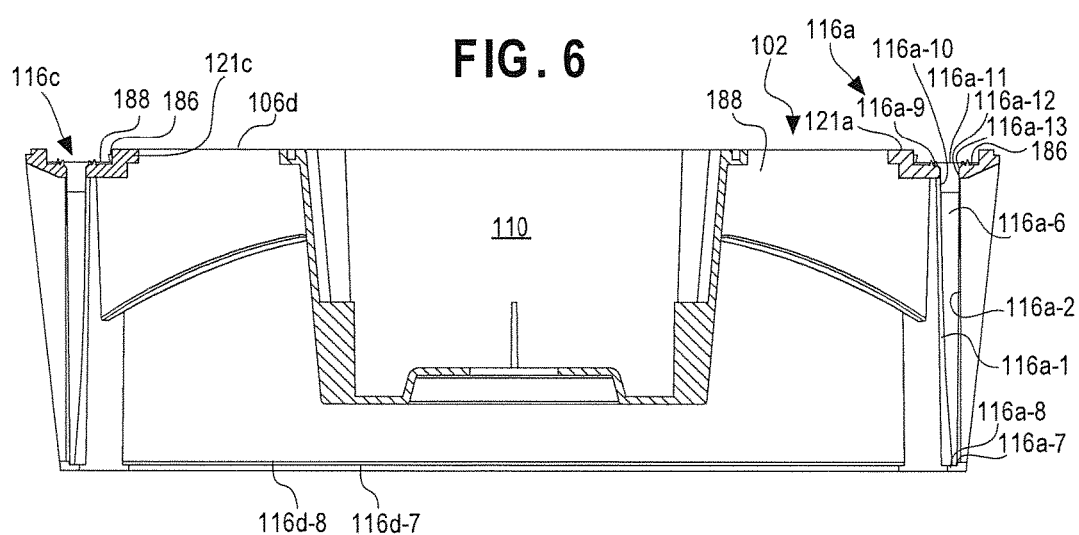

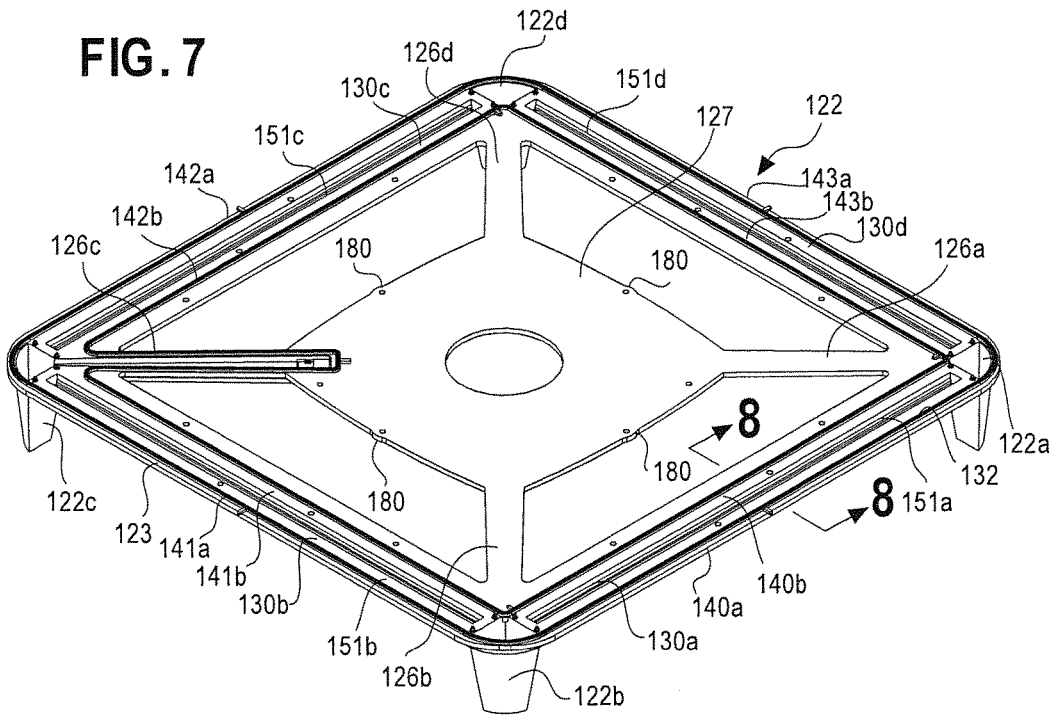
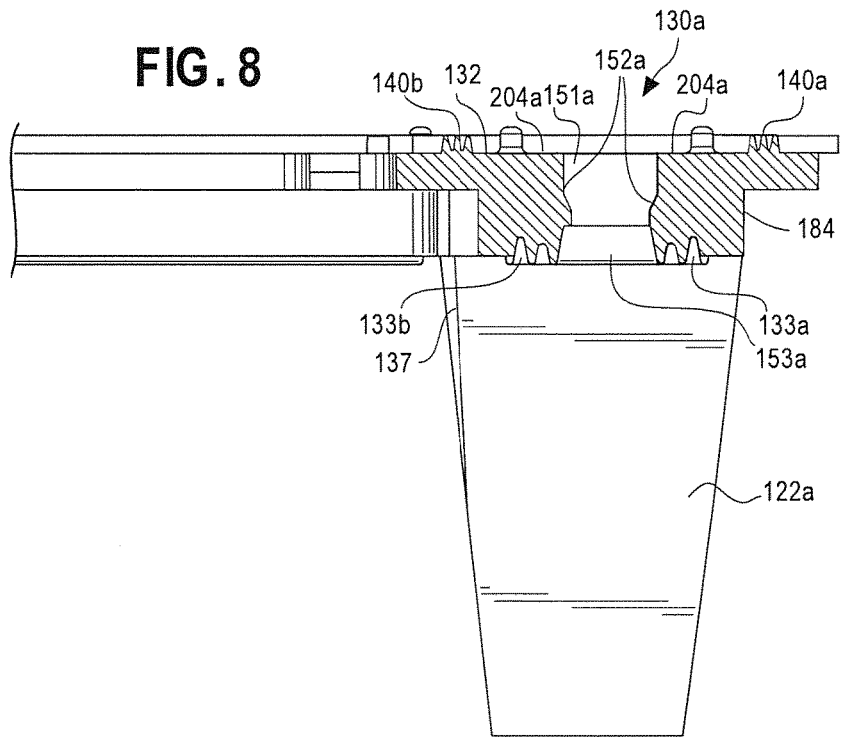

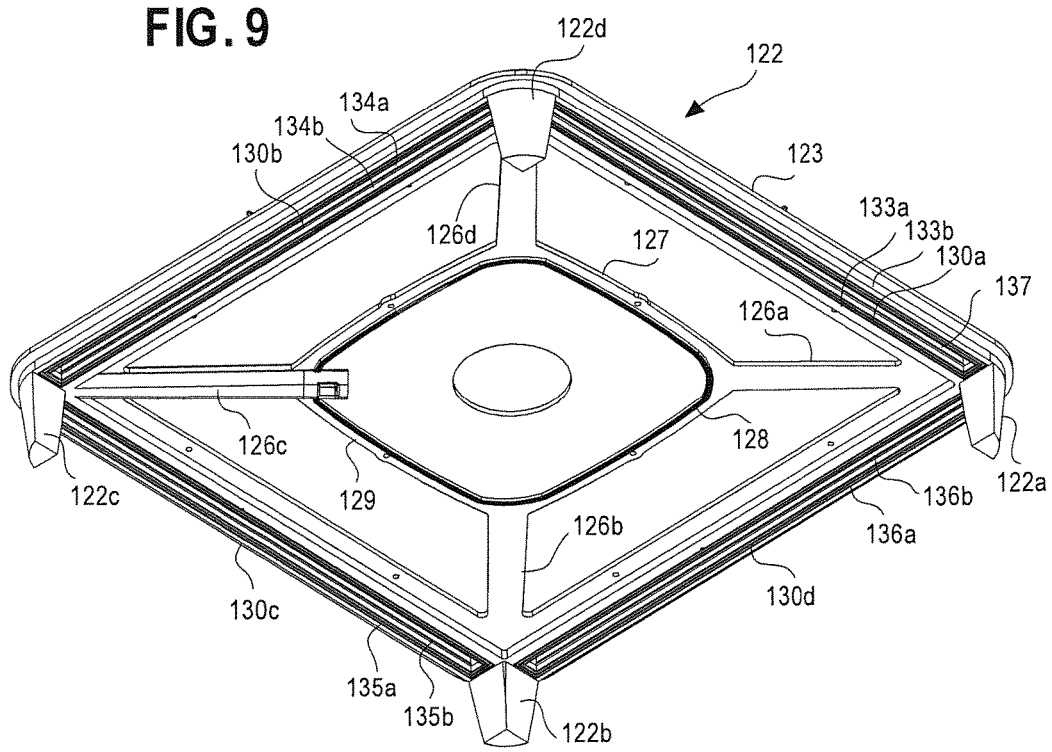

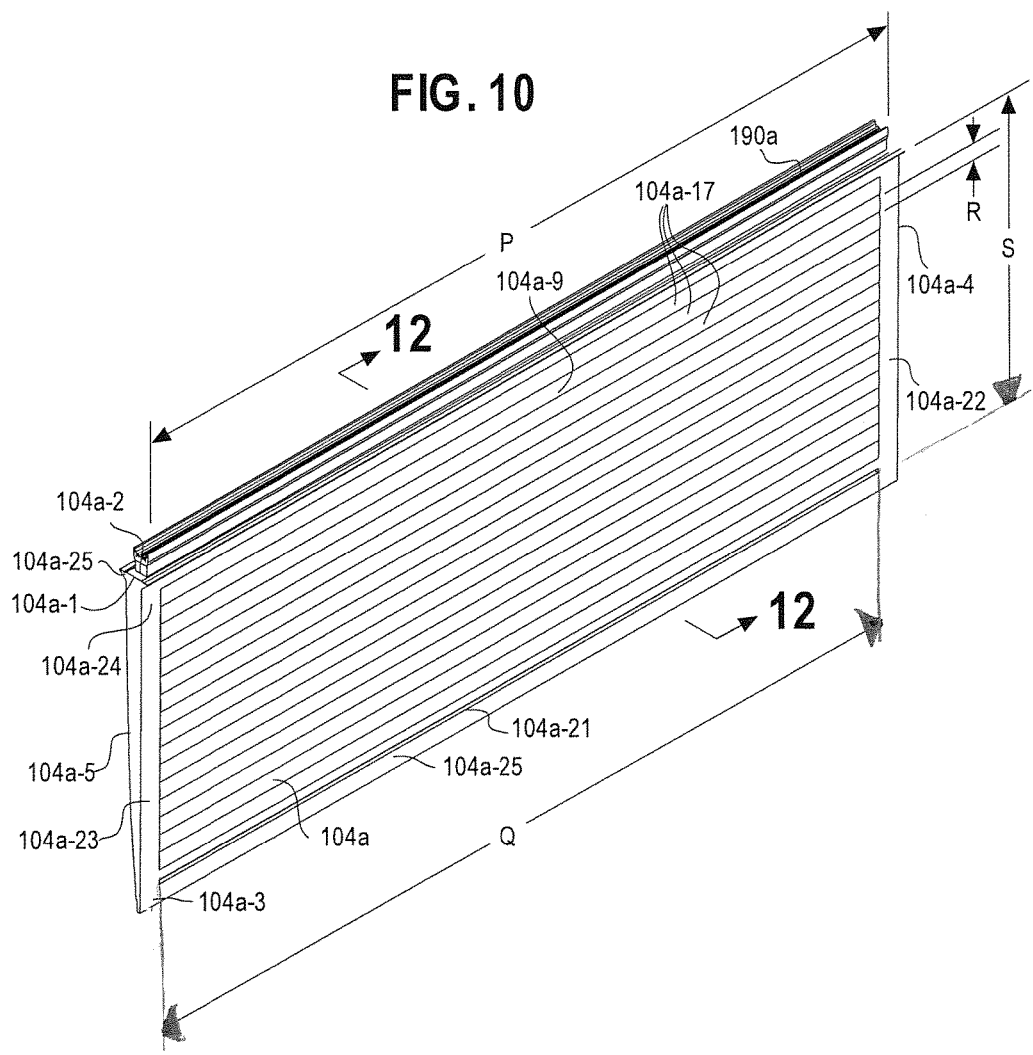

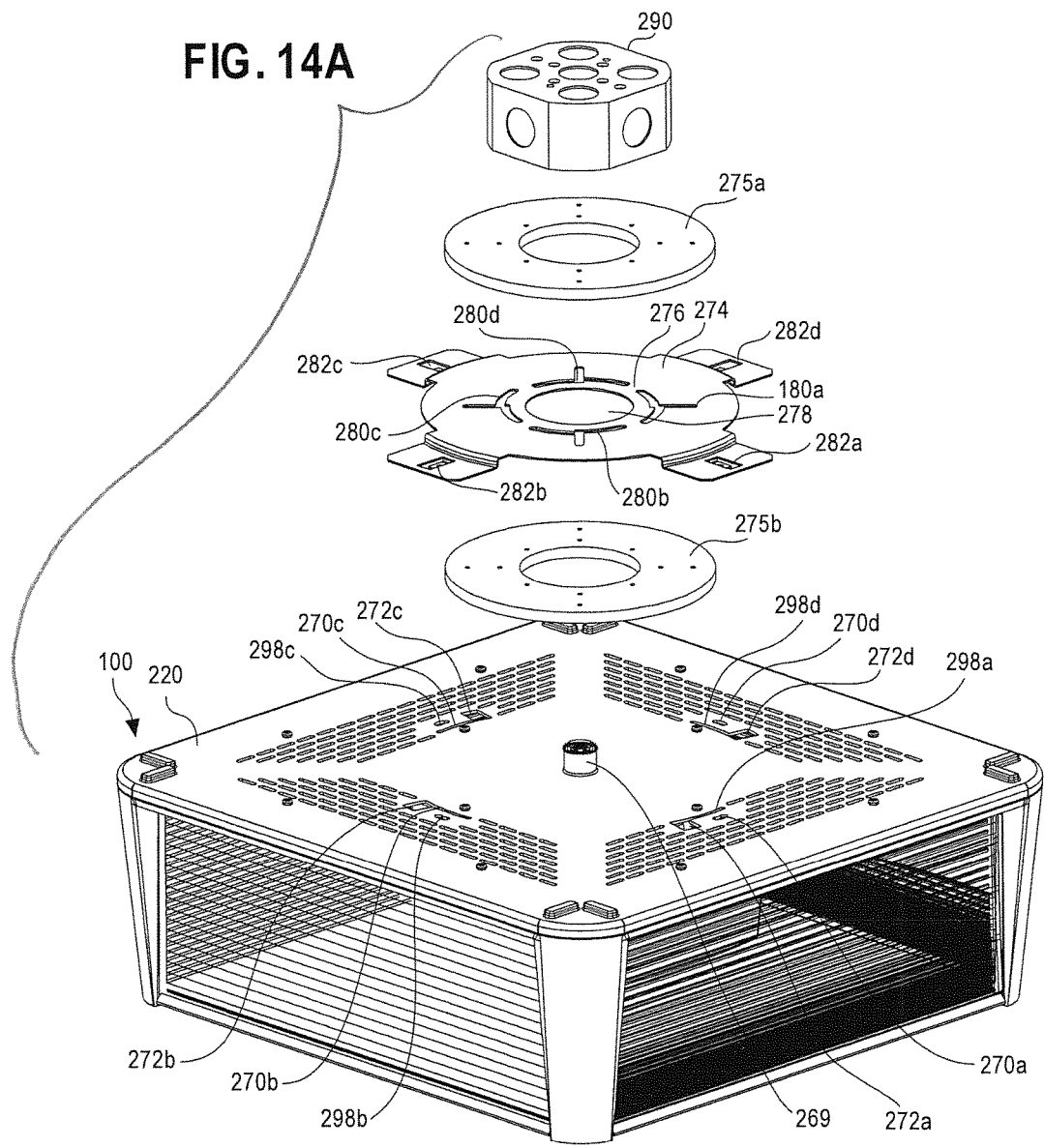

OUTDOOR AND/OR ENCLOSED STRUCTURE LED LUMINAIRE

CROSS REFERENCE TO RELATED APPLICATIONS

This divisional patent application claims the benefit of U.S. patent application Ser. No. 14/671,512, filed Mar. 27, 2015, entitled "Outdoor and/or Enclosed Structure LED Luminaire", which claims the benefit of U.S. Provisional Patent Application No. 61/922,017, filed Dec. 30, 2013, entitled "Optical Waveguide Bodies and Luminaires Utilizing Same", U.S. Provisional Patent Application No. 62/005,955, filed May 30, 2014, entitled "Parking Structure LED Light", U.S. Provisional Patent Application No. 62/009,039, filed Jun. 6, 2014, entitled "Parking Structure LED Light", U.S. Provisional Patent Application No. 62/005,965, filed May 30, 2014, entitled "Luminaire Utilizing Waveguide", U.S. Provisional Patent Application No. 62/025,436, filed Jul. 16, 2014, entitled "Luminaire Utilizing Waveguide", and U.S. Provisional Patent Application No. 62/025,905, filed Jul. 17, 2014, entitled "Luminaire Utilizing Waveguide", all owned by the assignee of the present application, and the disclosures of which are incorporated by reference herein.

This divisional patent application claims the benefit of U.S. patent application Ser. No. 14/671,512, filed Mar. 27, 2015, entitled "Outdoor and/or Enclosed Structure LED Luminaire", which further comprises a continuation-in-part of U.S. Pat. No. 9,519,095, filed Mar. 15, 2013, entitled "Optical Waveguides", and which further comprises a continuation-in-part of U.S. Pat. No. 9,389,367, filed Jul. 10, 2013, entitled "Optical Waveguide and Luminaire Incorporating Same", and which further comprises a continuation-in-part of U.S. Pat. No. 9,411,086, filed Dec. 9, 2013, entitled "Optical Waveguide Assembly and Light Engine Including Same", and which further comprises a continuation-in-part of U.S. Pat. No. 9,366,396, filed Dec. 9, 2013, entitled "Optical Waveguide and Lamp Including Same", and which further comprises a continuation-in-part of U.S. Pat. No. 9,513,424, filed Aug. 18, 2014, entitled "Optical Components for Luminaire", and which further comprises a continuation-in-part of U.S. Pat. No. 9,366,799, filed May 30, 2014, entitled "Optical Waveguide Bodies and Luminaires Utilizing Same", and which further comprises a continuation-in-part of U.S. patent application Ser. No. 14/577,730, filed Dec. 19, 2014, entitled "Optical Waveguide Bodies and Luminaires Utilizing Same", and which further comprises a continuation-in-part of U.S. patent application Ser. No. 14/583,415, filed Dec. 26, 2014, entitled "Outdoor and/or Enclosed Structure LED Luminaire", all owned by the assignee of the present application, and the disclosures of which are incorporated by reference herein.

The present application further comprises a continuation-in-part of U.S. patent application Ser. No. 13/839,949, filed Mar. 15, 2013, entitled "Optical Waveguide and Lamp Including Same", and further comprises a continuation-in-part of U.S. patent application Ser. No. 13/840,563, filed Mar. 15, 2013, entitled "Optical Waveguide and Luminaire Incorporating Same", and further comprises a continuation-in-part of U.S. patent application Ser. No. 14/101,086, filed Dec. 9, 2013, entitled "Optical Waveguides and Luminaires Incorporating Same", and further comprises a continuation-in-part of U.S. patent application Ser. No. 14/101,129, filed Dec. 9, 2013, entitled "Simplified Low Profile Module With Light Guide For Pendant, Surface Mount, Wall Mount and Stand Alone Luminaires", and further comprises a continuation-in-part of International Application No. PCT/US14/13937, filed Jan. 30, 2014, entitled "Optical Waveguide Bodies and Luminaires Utilizing Same", and further comprises a continuation-in-part of International Application No. PCT/US14/13931, filed Jan. 30, 2014, entitled "Optical Waveguides and Luminaires Incorporating Same", and further comprises a continuation-in-part of International Application No. PCT/US14/30017, filed Mar. 15, 2014, entitled "Optical Waveguide Body", and further comprises a continuation-in-part of U.S. application Ser. No. 14/462,426, filed Aug. 18, 2014, entitled "Outdoor and Enclosed Structure LED Luminaire for General Illumination Applications, Such as Parking Lots and Structures", and further comprises a continuation-in-part of U.S. application Ser. No. 14/462,322, filed Aug. 18, 2014, entitled "Flood Optic", and further comprises a continuation-in-part of U.S. patent application Ser. No. 14/485,609, filed Sep. 12, 2014, entitled "Luminaire Utilizing Waveguide", and further comprises a continuation-in-part of U.S. patent application Ser. No. 14/583,415, filed Dec. 26, 2014, entitled "Outdoor and/or Enclosed Structure LED Luminaire", all owned by the assignee of the present application, and the disclosures of which are incorporated by reference herein.

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to general illumination lighting, and more particularly, to outdoor and/or enclosed structure luminaires usable, for example, in parking lots and structures.

BACKGROUND

Large areas of open space, such as a parking lot or deck of a parking garage, require sufficient lighting to allow for safe travel of vehicles and persons through the space at all times including periods of reduced natural lighting such as nighttime, rainy, or foggy weather conditions. A luminaire for an outdoor parking lot or covered parking deck must illuminate a large area of space in the vicinity of the luminaire while controlling glare so as not to distract drivers. Still further, such a luminaire should be universal in the sense that the luminaire can be mounted in various enclosed and non-enclosed locations, on poles or on a surface (such as a garage ceiling), and preferably present a uniform appearance Furthermore, the luminaire used to illuminate a parking lot or structure must be of sturdy construction to withstand wind and other forces and to resist weathering yet be light enough to allow for ease of installation. Additionally, such a luminaire should be aesthetically pleasing.

Advances in light emitting diode (LED) technology have resulted in wide adoption of luminaires that incorporate such devices. While LEDs can be used alone to produce light without the need for supplementary optical devices, it has been found that optical modifiers, such as lenses, reflectors, optical waveguides, and combinations thereof, can significantly improve illumination distribution for particular applications.

An optical waveguide mixes and directs light emitted by one or more light sources, such as one or more LEDs. A typical optical waveguide includes three main components: one or more coupling elements, one or more distribution elements, and one or more extraction elements. The coupling component(s) direct light into the distribution element(s), and condition the light to interact with the subsequent components. The one or more distribution elements control how light flows through the waveguide and is dependent on the waveguide geometry and material. The extraction element(s) determine how light is removed by controlling where and in what direction the light exits the waveguide.

When designing a coupling optic, the primary considerations are: maximizing the efficiency of light transfer from the source into the waveguide; controlling the location of light injected into the waveguide; and controlling the angular distribution of the light in the coupling optic. One way of controlling the spatial and angular spread of injected light is by fitting each source with a dedicated lens. These lenses can be disposed with an air gap between the lens and the coupling optic, or may be manufactured from the same piece of material that defines the waveguide's distribution element(s). Discrete coupling optics allow numerous advantages such as higher efficiency coupling, controlled overlap of light flux from the sources, and angular control of how the injected light interacts with the remaining elements of the waveguide. Discrete coupling optics use refraction, total internal reflection, and surface or volume scattering to control the distribution of light injected into the waveguide.

After light has been coupled into the waveguide, it must be guided and conditioned to the locations of extraction. The simplest example is a fiber-optic cable, which is designed to transport light from one end of the cable to another with minimal loss in between. To achieve this, fiber optic cables are only gradually curved and sharp bends in the waveguide are avoided. In accordance with well-known principles of total internal reflectance light traveling through a waveguide is reflected back into the waveguide from an outer surface thereof, provided that the incident light does not exceed a critical angle with respect to the surface. Specifically, the light rays continue to travel through the waveguide until such rays strike an index interface surface at a particular angle less than an angle measured with respect to a line normal to the surface point at which the light rays are incident (or, equivalently, until the light rays exceed an angle measured with respect to a line tangent to the surface point at which the light rays are incident) and the light rays escape.

In order for an extraction element to remove light from the waveguide, the light must first contact the feature comprising the element. By appropriately shaping the waveguide surfaces, one can control the flow of light across the extraction feature(s). Specifically, selecting the spacing, shape, and other characteristic(s) of the extraction features affects the appearance of the waveguide, its resulting distribution, and efficiency.

Hulse U.S. Pat. No. 5,812,714 discloses a waveguide bend element configured to change a direction of travel of light from a first direction to a second direction. The waveguide bend element includes a collector element that collects light emitted from a light source and directs the light into an input face of the waveguide bend element. Light entering the bend element is reflected internally along an outer surface and exits the element at an output face. The outer surface comprises beveled angular surfaces or a curved surface oriented such that most of the light entering the bend element is internally reflected until the light reaches the output face Parker et al. U.S. Pat. No. 5,613,751 discloses a light emitting panel assembly that comprises a transparent light emitting panel having a light input surface, a light transition area, and one or more light sources. Light sources are preferably embedded or bonded in the light transition area to eliminate any air gaps, thus reducing light loss and maximizing the emitted light. The light transition area may include reflective and/or refractive surfaces around and behind each light source to reflect and/or refract and focus the light more efficiently through the light transition area into the light input surface of the light-emitting panel. A pattern of light extracting deformities, or any change in the shape or geometry of the panel surface, and/or coating that causes a portion of the light to be emitted, may be provided on one or both sides of the panel members. A variable pattern of deformities may break up the light rays such that the internal angle of reflection of a portion of the light rays will be great enough to cause the light rays either to be emitted out of the panel or reflected back through the panel and emitted out of the other side.

Shipman, U.S. Pat. No. 3,532,871 discloses a combination running light reflector having two light sources, each of which, when illuminated, develops light that is directed onto a polished surface of a projection. The light is reflected onto a cone-shaped reflector. The light is transversely reflected into a main body and impinges on prisms that direct the light out of the main body.

Simon U.S. Pat. No. 5,897,201 discloses various embodiments of architectural lighting that is distributed from contained radially collimated light. A quasi-point source develops light that is collimated in a radially outward direction and exit means of distribution optics direct the collimated light out of the optics.

Kelly et al. U.S. Pat. No. 8,430,548 discloses light fixtures that use a variety of light sources, such as an incandescent bulb, a fluorescent tube and multiple LEDs. A volumetric diffuser controls the spatial luminance uniformity and angular spread of light from the light fixture. The volumetric diffuser includes one or more regions of volumetric light scattering particles. The volumetric diffuser may be used in conjunction with a waveguide to extract light.

Dau et al U.S. Pat. No. 8,506,112 discloses illumination devices having multiple light emitting elements, such as LEDs disposed in a row. A collimating optical element receives light developed by the LEDs and a light guide directs the collimated light from the optical element to an optical extractor, which extracts the light.

A.L.P. Lighting Components, Inc. of Niles, Ill., manufactures a waveguide having a wedge shape with a thick end, a narrow end, and two main faces therebetween. Pyramid-shaped extraction features are formed on both main faces. The wedge waveguide is used as an exit sign such that the thick end of the sign is positioned adjacent a ceiling and the narrow end extends downwardly. Light enters the waveguide at the thick end and is directed down and away from the waveguide by the pyramid-shaped extraction features.

Low-profile LED-based luminaires have recently been developed (e.g., General Electric's ET series panel troffers) that utilize a string of LED components directed into the edge of a waveguiding element (an "edge-lit" approach). However, such luminaires typically suffer from low efficiency due to losses inherent in coupling light emitted from a predominantly Lambertian emitting source such as a LED component into the narrow edge of a waveguide plane.

Smith U.S. Pat. Nos. 7,083,313 and 7,520,650 disclose a light direction device for use with LEDs. In one embodiment, the light direction device includes a plurality of opposing collimators disposed about a plurality of LEDs on one side of the device. Each collimator collimates light developed by the LEDs and directs the collimated light through output surfaces of the collimators toward angled reflectors disposed on a second side opposite the first side of the device. The collimated light reflects off the reflectors and out of the device from the one side perpendicular thereto. In another embodiment, the collimators are integral with a waveguide having reflective surfaces disposed on a second side of the waveguide, and the collimated light is directed toward the reflective surfaces. The light incident on the reflective surfaces is directed from the one side of the device, as in the one embodiment.

SUMMARY

According to one embodiment, a luminaire for use in lighting a large open space such as a parking lot or deck of a parking garage includes a plurality of optical waveguides disposed in side-by-side relationship and together defining a closed path. At least one LED associated with each optical waveguide is disposed at a first end of the associated optical waveguide.

According to another embodiment, a luminaire includes a main frame and a plurality of optical waveguides disposed in the main frame. Each optical waveguide includes first and second opposite waveguide ends, a coupling portion disposed at the first waveguide end, and a light emitting portion disposed between the first and second waveguide ends. At least one waveguide is disposed at an angle relative to at least one other waveguide. The coupling portions of the waveguides are disposed adjacent a first luminaire end, and the second waveguide ends are disposed adjacent a second luminaire end opposite the first luminaire end. At least one LED elements is associated with each optical waveguide.

According to yet another embodiment, a luminaire comprises a main frame having a plurality of receptacles and a plurality of optical waveguides disposed in the receptacles of the main frame in side-by-side relationship wherein the optical waveguides are all of substantially the same size and shape. A gasket frame has a peripheral recess and upper and lower gaskets and a plurality of optical coupling portions is disposed in the recess of the gasket frame wherein each optical coupling portion is associated with and is adapted to direct light into an associated optical waveguide. A plurality of LEDs is associated with each optical coupling portion and is disposed in the recess of the gasket frame and adapted to direct light into associated optical coupling portion. A circuit element interconnects the plurality of LEDs and is disposed in the recess of the gasket frame. A cover plate is disposed on the main frame such that the gasket frame is disposed therebetween and such that the upper and lower gaskets seal against the cover plate and the main frame, respectively.

Other aspects and advantages will become apparent upon consideration of the following detailed description and the attached drawings wherein like numerals designate like structures throughout the specification.

BRIEF DESCRIPTION OF THE DRAWINGS

FIG. 5 is an isometric view of the main frame of FIGS. 1 and 2;

FIG. 6 is a sectional view of the main frame taken generally along the lines 6-6 of FIG. 5;

FIG. 7 is a an isometric view from above of the auxiliary frame of FIGS. 1 and 2;

FIG. 8 is a sectional view taken generally along the lines 8-8 of FIG. 7;

FIG. 9 is a an isometric view from below of the auxiliary frame of FIG. 7;

FIG. 10 is an isometric front view of one of the optical waveguides and coupling members of the luminaire of FIGS. 1 and 2;

FIGS. 14 and 14A are isometric views of embodiments of junction box mountable luminaires;

DETAILED DESCRIPTION

Figure 1:
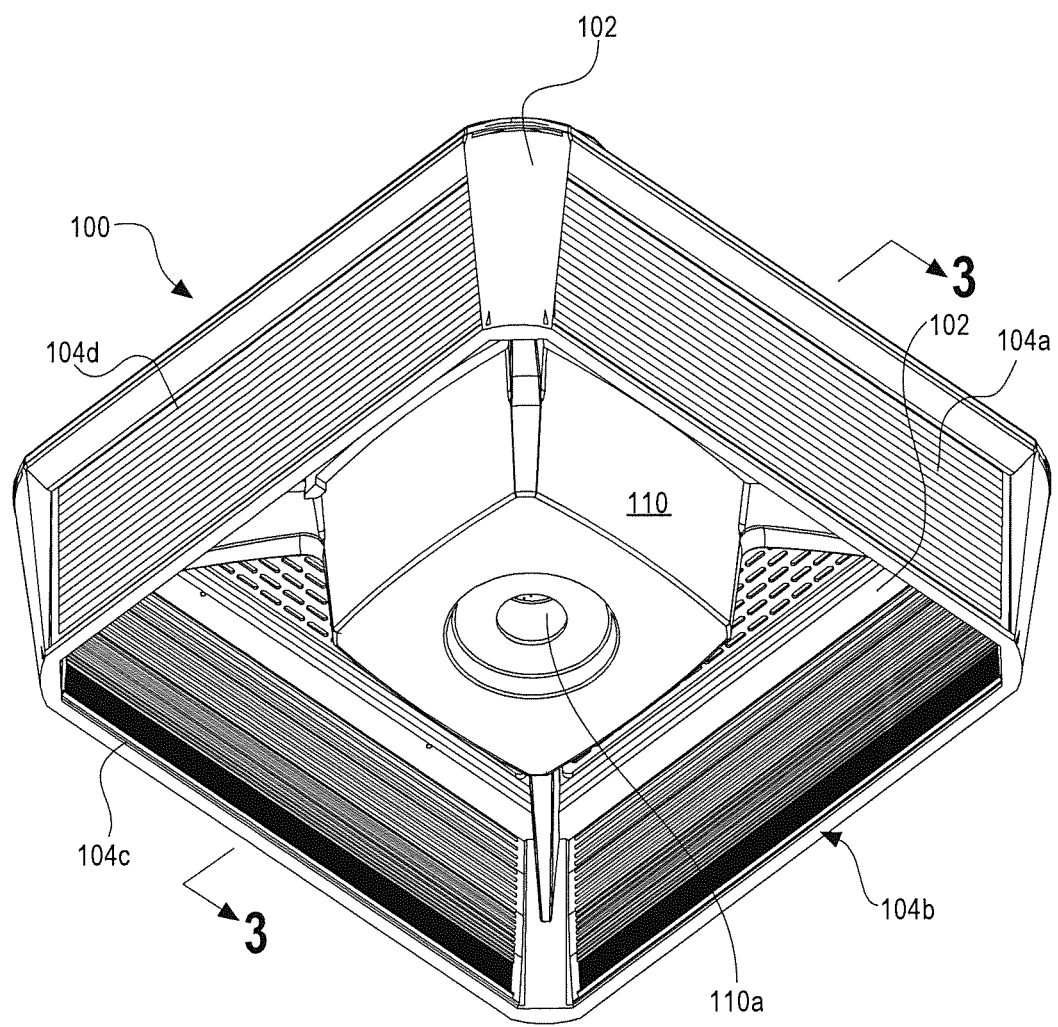
FIG. 1 is an isometric view from below of an embodiment of a luminaire with an illumination sensor omitted therefrom.

As shown in FIGS. 1-4, disclosed herein is a luminaire 100 for general lighting, more particularly, for illumination of an open space and, specifically, a parking lot or parking deck of a garage. The luminaire 100 comprises a housing 102 that includes support structures (discussed hereinafter) by which the luminaire 100 can be supported. A first plurality of optical waveguides 104a-104d is disposed on and supported by the housing 102. A second plurality of light emitting diode elements or modules (LEDs) 105 is supported by the housing 102 as noted in greater detail hereinafter.

Each LED element or module 105 (FIGS. 3 and 4) may be a single white or other color LED chip or other bare component, or each may comprise multiple LEDs either mounted separately or together on a single substrate or package to form a module including, for example, at least one phosphor-coated LED either alone or in combination with at least one color LED, such as a green LED, a yellow LED, a red LED, etc. In those cases where a soft white illumination with improved color rendering is to be produced, each LED element or module 105 or a plurality of such elements or modules may include one or more blue shifted yellow LEDs and one or more red LEDs. The LEDs 105 may be disposed in different configurations and/or layouts as desired. Different color temperatures and appearances could be produced using other LED combinations, as is known in the art. In one embodiment, the light source comprises any LED, for example, an MT-G LED incorporating TrueWhite® LED technology or as disclosed in U.S. patent application Ser. No. 13/649,067, filed Oct. 10, 2012, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. If desirable, a side emitting LED disclosed in U.S. Pat. No. 8,541,795, the disclosure of which is incorporated by reference herein, may be utilized. In some embodiments, each LED element or module 105 may comprise one or more LEDs disposed within a coupling cavity with an air gap being disposed between the LED element or module 105 and a light input surface. In any of the embodiments disclosed herein each of the LED element(s) or module(s) 105 preferably have a lambertian or near-lambertian light distribution, although each may have a directional emission distribution (e.g., a side emitting distribution), as necessary or desirable. More generally, any lambertian, symmetric, wide angle, preferential-sided, or asymmetric beam pattern LED element(s) or module(s) may be used as the light source.

Each waveguide 104 may have any suitable shape, and the shapes of the waveguides 104 may be different from one another or substantially identical. For example, a first subset less than all of the waveguides 104 may be substantially identical to one another, and some or all of the remaining waveguides 104 comprising a second subset may be different than the waveguides of the first subset. In this latter case, the waveguides of the second subset may be substantially identical to each other or some or all may be different from one another. Any combination of substantially identical and/or different waveguides 104 that develop identical or different light illumination distributions is contemplated. Also, although four waveguides 104 are illustrated in the FIGS., a different number of waveguides could be used, as noted in greater detail hereinafter. In some embodiments, two or more waveguides may be disposed at an angle α (FIG. 4) relative to one another. In one such embodiment, the angle α may be approximately 90 degrees. In another embodiment, the angle α may be greater or less than 90 degrees to produce a desired distribution. Still further, the material(s) of the waveguides 104 preferably comprise optical grade materials that exhibit TIR characteristics including, but not limited to, one or more of acrylic, air, polycarbonate, molded silicone, glass, and/or cyclic olefin copolymers, and combinations thereof, possibly in a layered arrangement, to achieve a desired effect and/or appearance. Preferably, although not necessarily, the waveguides 104 are all solid or some or all have one or more voids or discrete bodies of differing materials therein. The waveguides 104 may be fabricated using procedures such as hot embossing or molding, including injection/compression molding. Other manufacturing methods may be used as desired.

Figure 18:
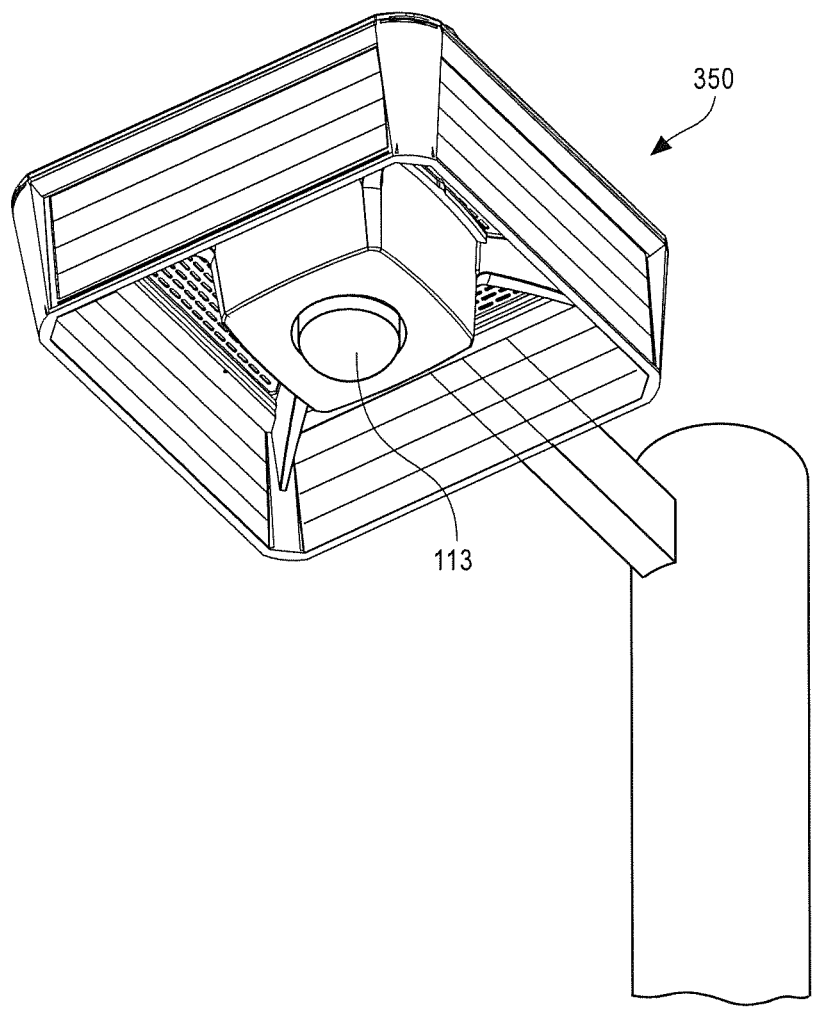
Figure 19:
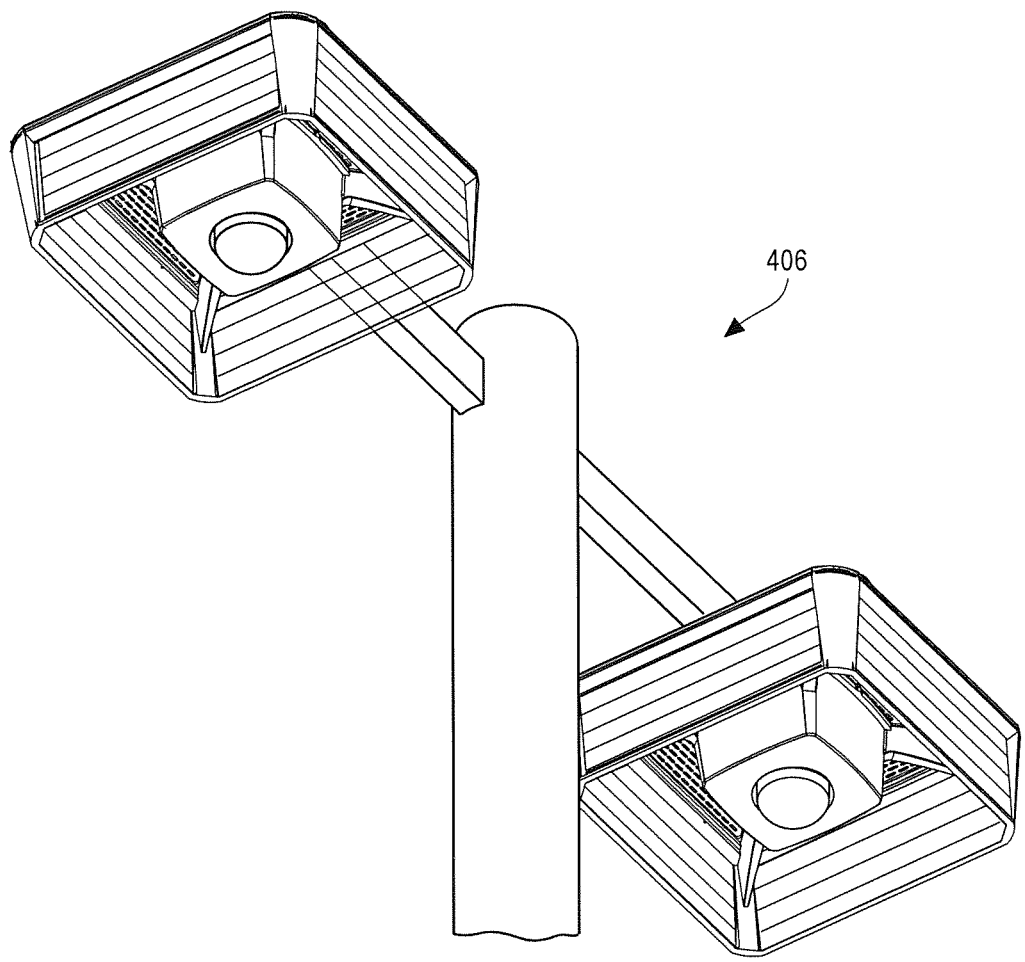
FIGS. 19-21 are bottom isometric views of embodiments of multiple post mounted luminaires.
Figure 20:
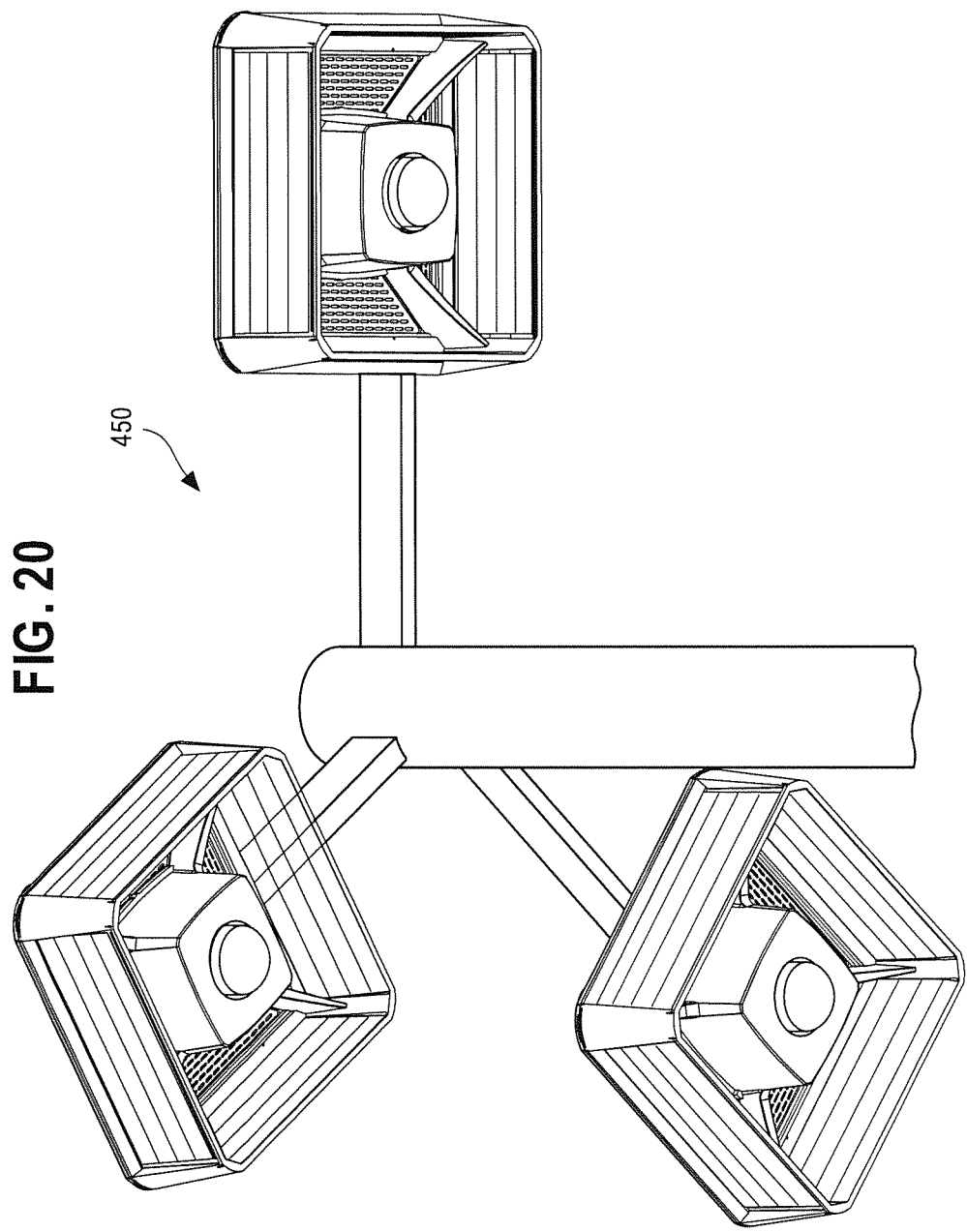
Figure 21:
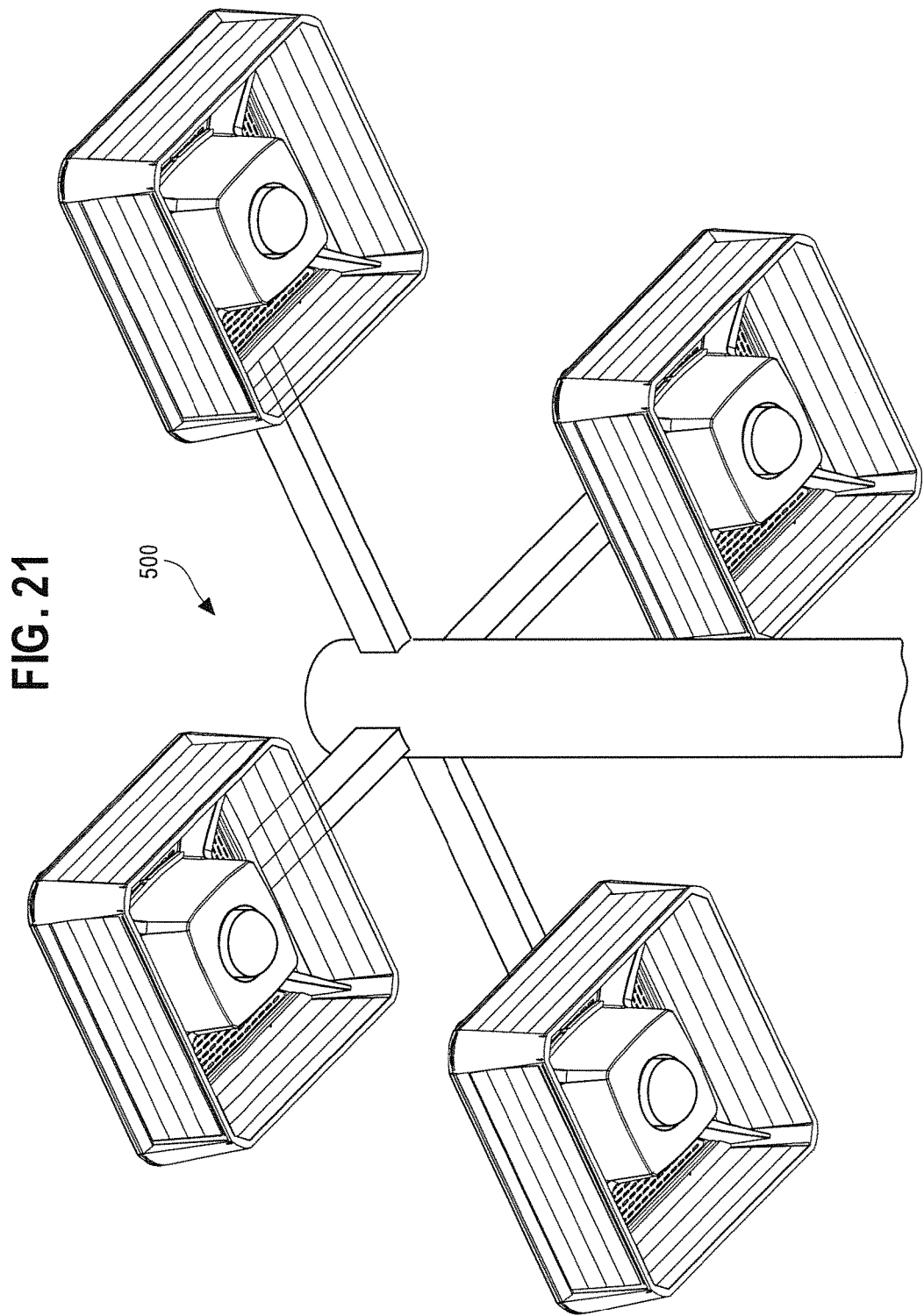

Referring also to FIGS. 5-9, the housing 102 has at least one, and, more preferably, four support brackets 106a-106d that extend diagonally between opposite corners 108a, 108c and 108b, 108d. The support brackets 106 support an open central enclosure 110. Operating circuitry 112 is disposed and retained in the central enclosure 110. Any of the embodiments disclosed herein may include operating circuitry 112 comprising a power circuit having a buck regulator, a boost regulator, a buck-boost regulator, a SEPIC power supply, or the like, and may comprise a driver circuit as disclosed in U.S. patent application Ser. No. 14/291,829, filed May 30, 2014, entitled "High Efficiency Driver Circuit with Fast Response" by Hu et al., or U.S. patent application Ser. No. 14/292,001, filed May 30, 2014, entitled "SEPIC Driver Circuit with Low Input Current Ripple" by Hu et al. incorporated by reference herein. An infrared or other sensor 113 (FIG. 18) may be supported in a lower opening 110a (FIG. 1) of the enclosure 110 and may comprise a part of the operating circuitry 112. The sensor 113 may be provided to cause the balance of the operating circuitry to energize or vary the illumination level of the luminaire 100 in accordance with sensed ambient light levels.

Figure 11:
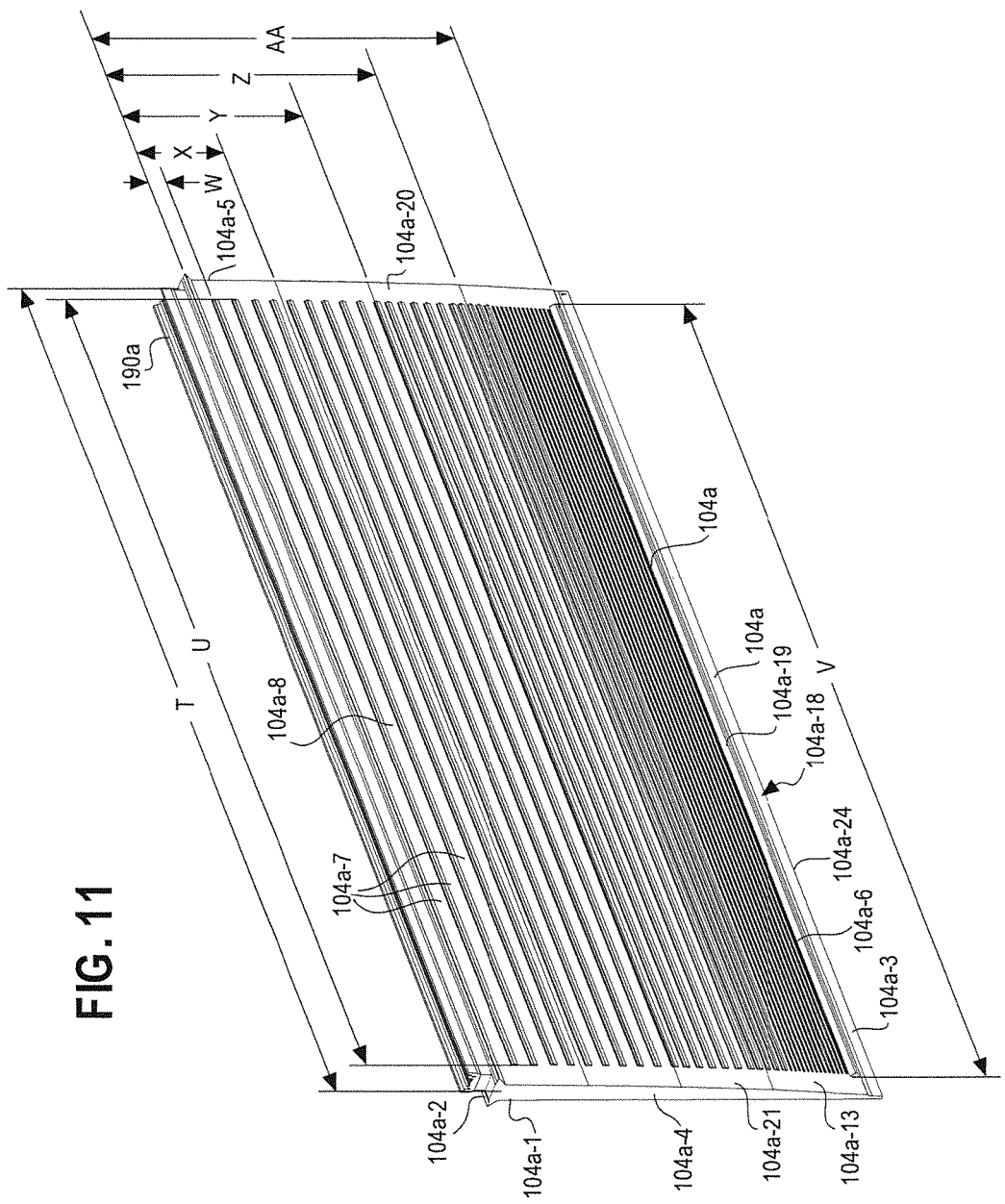
FIG. 11 is an isometric rear view of one of the optical waveguides and coupling members of the luminaire of FIGS. 1 and 2.

In the illustrated embodiment, the housing 102 comprises a main frame 114 having channeled receptacles 116a-116d that receive the waveguides 104a-104d, respectively. Preferably, although not necessarily, the waveguides 104a-104d are all substantially, if not entirely, identical to one another, as are the channeled receptacles 116, and hence, only the waveguide 104a and receptacle 116a will be described in detail herein. Also preferably, each waveguide 104 is disposed at equal or unequal angles with respect to adjacent waveguides 104 to define a partially or entirely closed path so that light is distributed at least partially about the path. As seen in FIG. 10, the waveguide 104a includes an enlarged tapered portion 104a-1 adjacent a first or top end 104a-2. The waveguide 104a further includes a second or bottom end 104a-3 and side edge portions 104a-4 and 104a-5. Referring to FIG. 11, a light emitting portion 104a-6 is disposed between the portion 104a-1 and end 104a-3. The light emitting portion 104a-6 includes a plurality of light extraction features 104a-7 disposed on or in a first or rear surface 104a-8 opposite a second or front surface 104a-9. It should be noted that the light extraction features 104a-7 may be irregularly spaced or some may be regularly spaced and others irregularly spaced, etc. In the illustrated embodiment, the plurality of light extraction features 104a-7 includes a first set of features 104a-10 (FIG. 12) that are relatively large and widely spaced and disposed at an upper portion of the waveguide 104a relatively nearer the tapered portion 104a-1. Each of the extraction features 104a-10 may be generally of the shape disclosed in International Application Serial No. PCT/US14/13937, filed Jan. 30, 2014, entitled "Optical Waveguide Bodies and Luminaires Utilizing Same", owned by the assignee of the present application and the disclosure of which is incorporated by reference herein. As seen in FIG.

12A, each feature 104a-10 comprises an elongate wedge-shaped channel or groove 104a-11 disposed adjacent an elongate wedge-shaped ridge or protrusion 104a-12, both of which preferably extend partially between the side edge portions 104a-4 and 104a-5 transversely (preferably, although not necessarily, perpendicularly) with respect thereto. The wedge-shaped channel 104a-11 includes an extraction surface 104a-11a formed at an angle θ (FIG. 11A) relative to the rear surface 104a-8. The angle θ may be constant, vary throughout the length of the extraction feature 104a-10, vary throughout the group of extraction features 104a-10, and/or vary throughout the groups of extraction features 104a-10, 104a-13, 104a-14, and/or 104a-15 described below. In some embodiments, the angle varies between about 25° and about 40°. Also preferably, although not necessarily, the channels and ridges of each feature 104a-10 are parallel to each other and to other channels and ridges of other features 104a-10.

The features 104a-7 further include three further groups of features 104a-13, 104a-14, and 104a-15 that progressively become smaller in size and more closely spaced together with distance from the upper end of the waveguide 104a. The features 104a-10, 104a-13, 104a-14, and 104a-15 define four segments with differing inter-feature angles γ (FIG. 11A) that further improve light intensity uniformity and the latter three groups 104a-13 through 104a-15 are disposed nearer the second end 104a-3 of the waveguide 104a than the group 104a-10. While the embodiment illustrated in FIG. 12 contains four groups of features, 104a-10, 104a-13, 104a-14, and 104a-15, the waveguide 104a may have more groups or fewer groups, depending on the desired light output. Moreover, one or more of the groups 104a-10, 104a-13, 104a-14, and 104a-15 may include a greater or lesser number of individual features depending on the desired light output.

Figure 12:
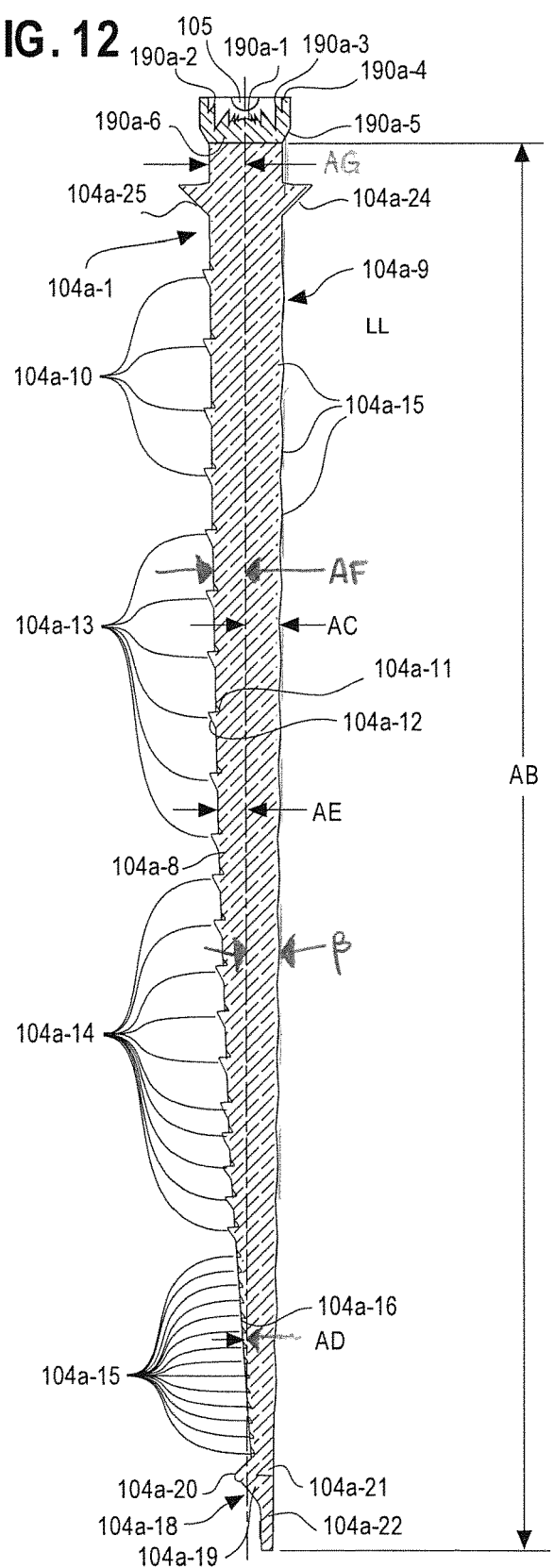
FIG. 12 is a sectional view taken generally along the lines 12-12 of FIG. 10.

As seen in FIG. 12, the back surface 104a-8 between each extraction feature 104a-7 defines an inter-feature angle γ relative to a line parallel to a line LL normal to an edge 104a-27 at the first end 104a-2 of the waveguide 104. In some embodiments, the inter-feature angle γ may range between about 0.5° and about 5°. In one example embodiment, the inter-feature angles γ of groups 104a-10, 104a-13, 104a-14, and 104a-15 may be 1°, 2°, 3°, and 4°, respectively. Similar to group 104a-10, each feature of the groups 104a-13 and 104a-14 include an elongate wedge-shaped channel or group similar to channel 104a-11 disposed adjacent an elongate wedge-shaped ridge or protrusion similar to ridge 104a-12, both of which preferably extend partially between the side edge portions 104a-4 and 104a-5 transversely (preferably, although not necessarily, perpendicularly) with respect thereto. Also preferably, although not necessarily, the channels and ridges of each feature 104a-13 and 104a-14 are parallel to each other and to other channels and ridges of other features 104a-10, 104a-13, and 104a-15. Group 104a-15 includes wedge-shaped channels 104a-16 seen in FIG. 12, that preferably extend partially between the side edge portions 104a-4 and 104a-5 transversely (preferably, although not necessarily, perpendicularly) with respect thereto. Further, the channels 104a-16 are preferably, although not necessarily, parallel to one another and parallel to the channels and ridges of each feature 104a-10. The features 104a-7 recycle at least some of the light that would otherwise escape out the rear surface 104a-8 of the waveguide 104a back into the waveguide 104a. The features 104a-7 are disposed at varying pitches (i.e., spacings), and/or have varying sizes, and define differing inter-feature angle γ segments so that light of substantially uniform intensity is emitted out the front surface 104a-9.

Figure 12A:
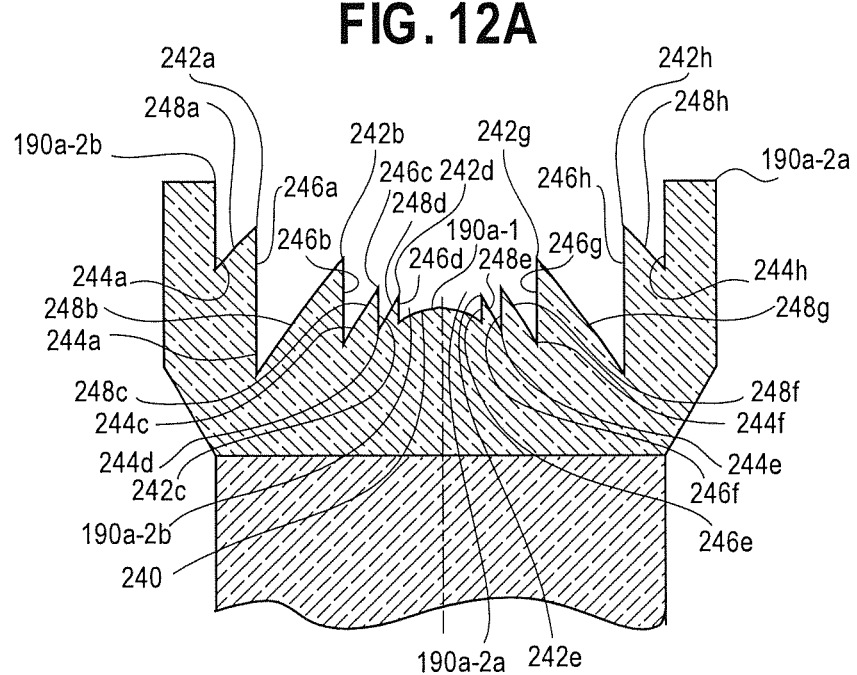
FIGS. 12A and 12B are enlarged, fragmentary views of the coupling member of FIG. 10.
Figure 12B:
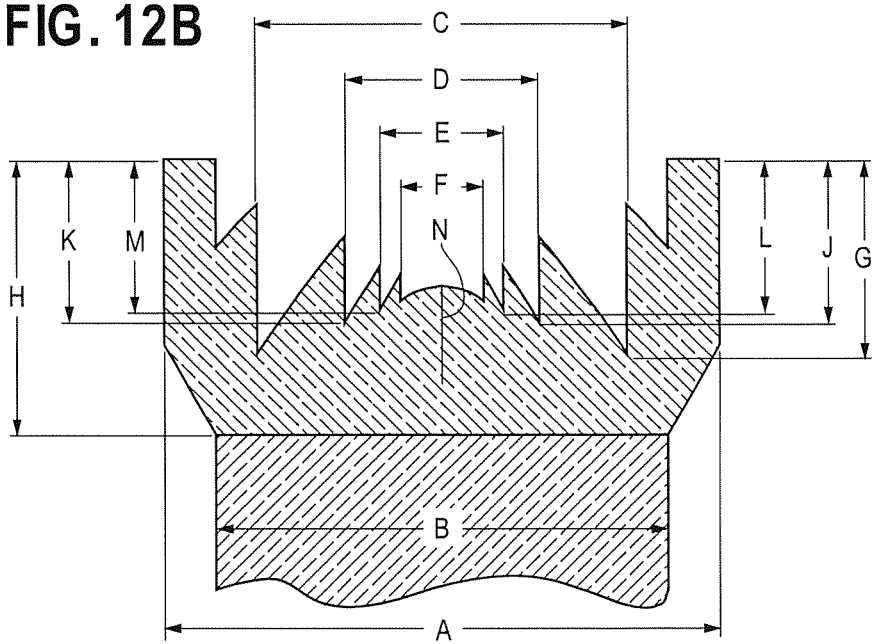
Figure 12C:
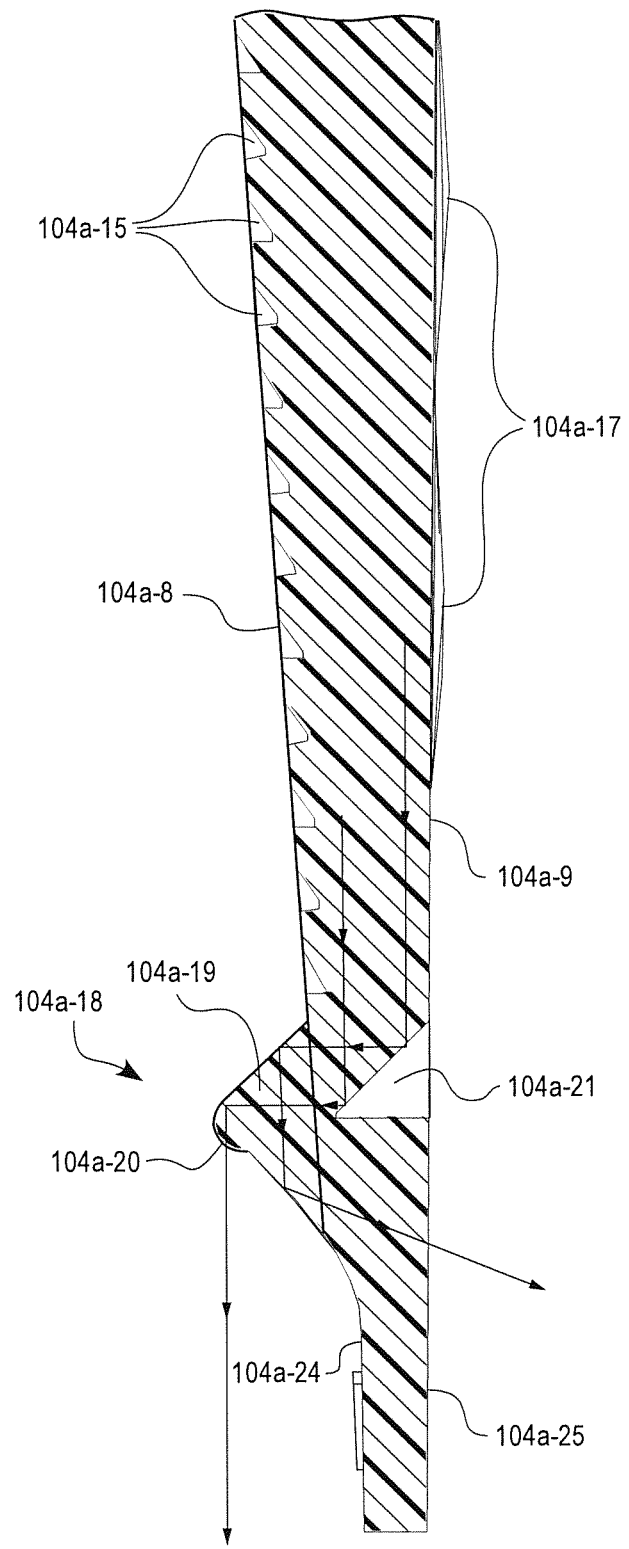
FIG. 12C is an enlarged, fragmentary sectional view of the optical waveguide of FIG. 10.

Referring to FIGS. 12 and 12C, the waveguide 104a further includes scalloped features 104a-17 disposed on or in the front surface 104a-9 and an end light extraction feature 104a-18 disposed adjacent the bottom end 104a-3. The end light extraction feature 104a-18 includes an elongate wedge-shaped protrusion 104a-19 disposed in or on the rear surface 104a-8 wherein the protrusion 104a-19 includes a downwardly directed rounded crest portion 104a-20. The end light extraction feature 104a-18 further includes an elongate wedge-shaped channel 104a-21 disposed on or in the front surface 104a-9. Preferably, the scalloped features 104a-17 and the wedge-shaped channel 104a-21 are parallel to the wedge-shaped protrusion 104a-19 and at least a portion of the channel 104a-21 is disposed within the top-to-bottom extent of the protrusion 104a-19. Still further, the scalloped features 104a-17, the protrusion 104a-19, and the channel 104a-21 preferably extend transversely (and, more preferably perpendicular) with respect to but do not extend fully between the side edge portions 104a-4 and 104a-5 such that side flanges 104a-22 and 104a-23 are defined adjacent the side edge portions 104a-4 and 104a-5, respectively. Further, bottom rear and front surfaces 104a-24, 104a-25 defining a flange extend below the end light extraction feature 104a-18 from the rear and front surfaces 104a-8, 104a-9, respectively. The waveguide 104a may have a slight concave curvature from top to bottom (as seen from the outside of the luminaire 100) to increase light distribution size as compared to a waveguide with no curvature. Additionally, the second or front surface 104a-9 may form an angle β relative to a line parallel to the line LL normal to the edge 104a-27 at the first end 104a-2 of the waveguide 104 as shown in FIG. 12. Further, the waveguide 104a is also tapered from top to bottom to maximize the possibility that light traveling through the waveguide 104a exits the waveguide during a single pass therethrough. To that end the end light extraction feature 104a-18 further ensures that light is extracted at the end of a single pass and, as seen in FIG. 12B, the feature 104a-18 causes a portion of the extracted light to be directed downwardly and a portion to be directed out of the front surface 104a-25. This "ray split" feature allows a separate or overmolded bottom frame member (described hereinafter) to be used without optical efficiency losses related to the absorption of light into the bottom frame member.

Figure 11A:
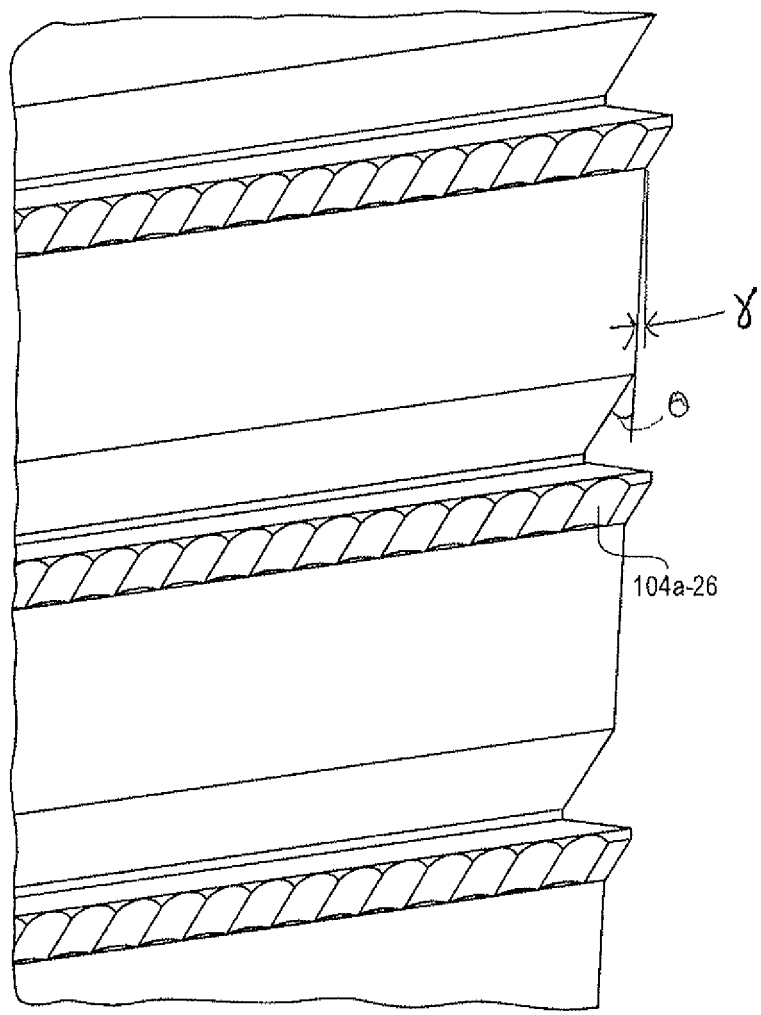
FIG. 11A is an enlarged, fragmentary view of the optical waveguide of FIG. 11.

Pixelization (i.e., the ability to image individual light sources) is minimized by preferably providing a series of curved indentations or protrusions 104a-26 (otherwise referred to as "fish-scale" features) disposed in a linear array above or below some or all of the light extraction features 104a-7, as seen in FIG. 11A. These features may be omitted in alternate embodiments, as noted in greater detail below.

The channeled receptacle 116a includes spaced side walls 116a-1, 116a-2 and 116a-3, 116a-4 defining opposed side channels 116a-5 and 116a-6, an upstanding bottom wall 116a-7 in part defining a bottom frame member, a base surface 116a-8, and surfaces 116a-9 through 116a-12 together defining a tapered top opening 116a-13 extending through a corresponding side member 121a of the main frame 114. During assembly, the bottom end 104a-3 of the waveguide 104a is inserted into the tapered top opening 116a-13 of the channeled receptacle 116a such that the side flanges 104a-22 and 104a-23 enter the opposed side channels 116a-5 and 116a-6, respectively. The waveguide 104a is further inserted into the channeled receptacle 116a until tapered lower surfaces 104a-24 and 104a-25 of the enlarged tapered portion 104a-1 are seated against tapered shoulder surfaces 116a-10 and 116a-11 of the surfaces 116a-9 and 116a-12 defining the tapered top opening 116a-13. At this time, the bottom end 104a-3 is disposed adjacent the upstanding bottom wall 116a-7 and, preferably, although not necessarily, the bottom end 104-3 contacts the base surface 116a-8.

The remaining waveguides 104b, 104c, and 104d include corresponding elements 104b-1 through 104b-25, 104c-1 through 104c-25, and 104d-1 through 104d-25, respectively, that are substantially similar or identical to the elements 104a-1 through 104a-25. The channeled receptacles 116b, 116c, and 116d include corresponding elements 116b-1 through 116b-13, 116c-1 through 116c-13, and 116d-1 through 116d-13, respectively, that are substantially similar or identical to the elements 116a-1 through 116a-13 and that receive the waveguides 104b, 104c, and 104d, respectively, in the same manner that the waveguide 104a is received in the channeled receptacle 116a.

In the illustrated embodiment, the waveguides 104a-104d are all disposed at the same, or substantially the same, elevation in the luminaire 100, although this need not be the case.

An auxiliary frame 122 is disposed on and secured to the main frame 114 after the waveguides 104 and circuitry 112 are placed into the receptacles 116 and the central enclosure 110, respectively. The auxiliary frame 122 includes an outer peripheral portion 123 having four nesting portions 124a-124d that are disposed in corner recesses 125a-125d of the main frame 114. Outer surfaces of the nesting portions 124 and inner surfaces of the corner recesses 125 are preferably, although not necessarily, complementarily shaped. The auxiliary frame 122 further includes inwardly diagonally directed arms 126a-126d that support a central cover portion 127. When the auxiliary frame 122 is disposed on the main frame 114 such that the nesting portions 124 extend into the corner recesses 125, the central cover portion 127 covers and encloses the central enclosure 110 and the operating circuitry 112 disposed therein. Sealing surface(s) forming a gasket 128 provides a seal between the cover portion 127 and the enclosure 110. The central cover portion 127 includes an opening 129 that allows access to the operating circuitry 110 so that utility electrical power may be connected to power supply wires as noted in greater detail hereinafter.

Referring to FIGS. 7-9, the outer peripheral portion 123 of the auxiliary frame 122 includes a plurality of channels 130a-130d that are aligned with the top ends 104a-1-104d-1 of the waveguides 104a-104d, respectively. The channels 130a-130d are substantially or completely identical and longitudinally extend partially or substantially fully between adjacent corner recesses 125. Each channel 130 extends from a first or upper face 132 and fully through the auxiliary frame 122. Lower seal members 133a, 133b, 134a, 134b, 135a, 135b, and 136a, 136b that may be integral with or separate from the auxiliary frame 122 surround each channel 130a-130d, respectively, at a second or lower face 137. Upper seal members 140a, 140b, 141a, 141b, 142a, 142b, and 143a, 143b that may be integral with or separate from the auxiliary frame 122 are disposed on either side of the channels 130a-130d at the upper face 132. Each channel 130a-130d includes an upper portion 151a-151d having a tapered portion 152a-152d, respectively, and a lower portion 153a-153d that receives a planar top end 104a-2, 104b-2, 104c-2, and 104d-2, of an associated waveguide 104a, 104b, 104c, and 104d, respectively.

Figure 3:
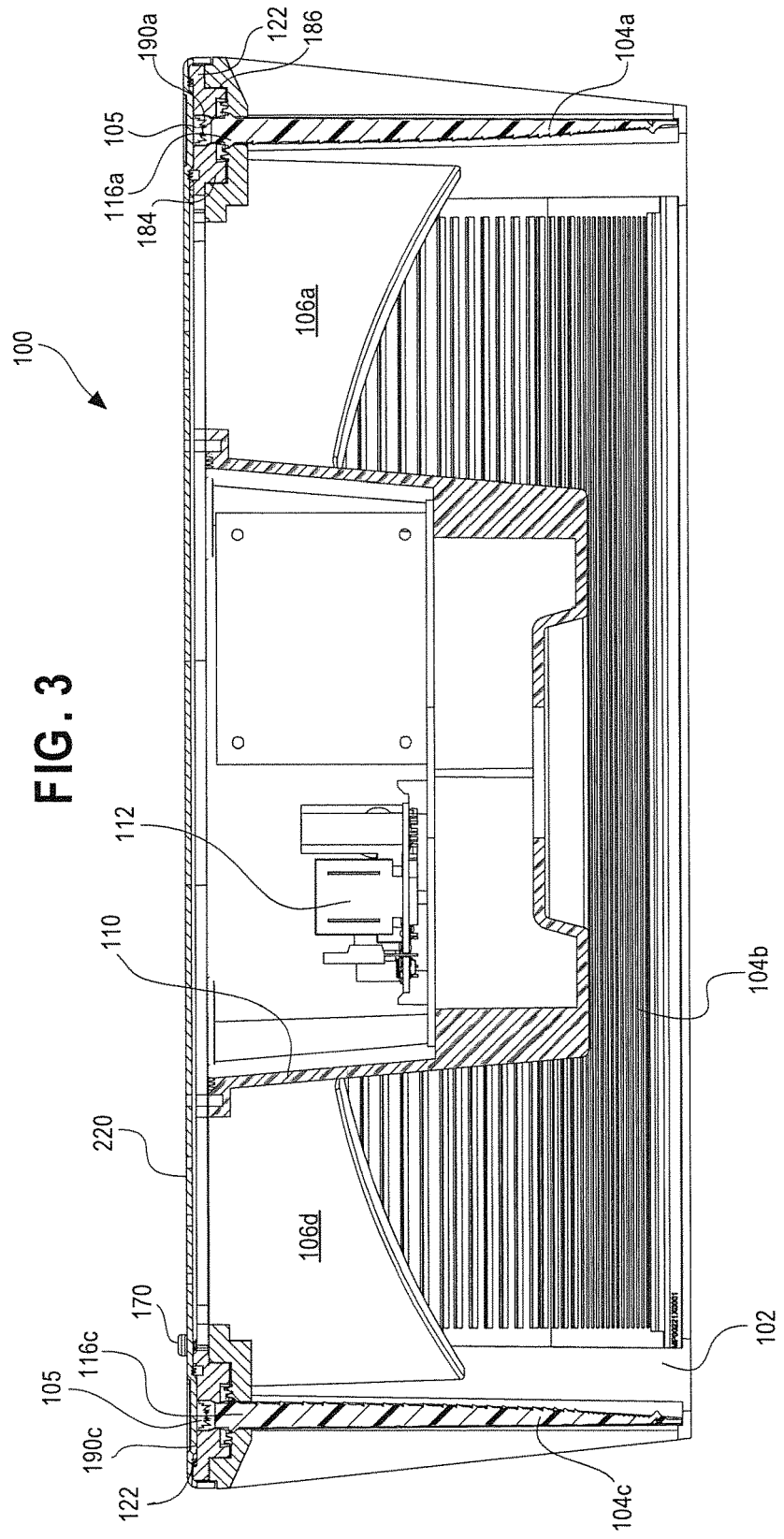
FIG. 3 is a sectional view taken generally along the lines 3-3 of FIG. 1.
Figure 4:
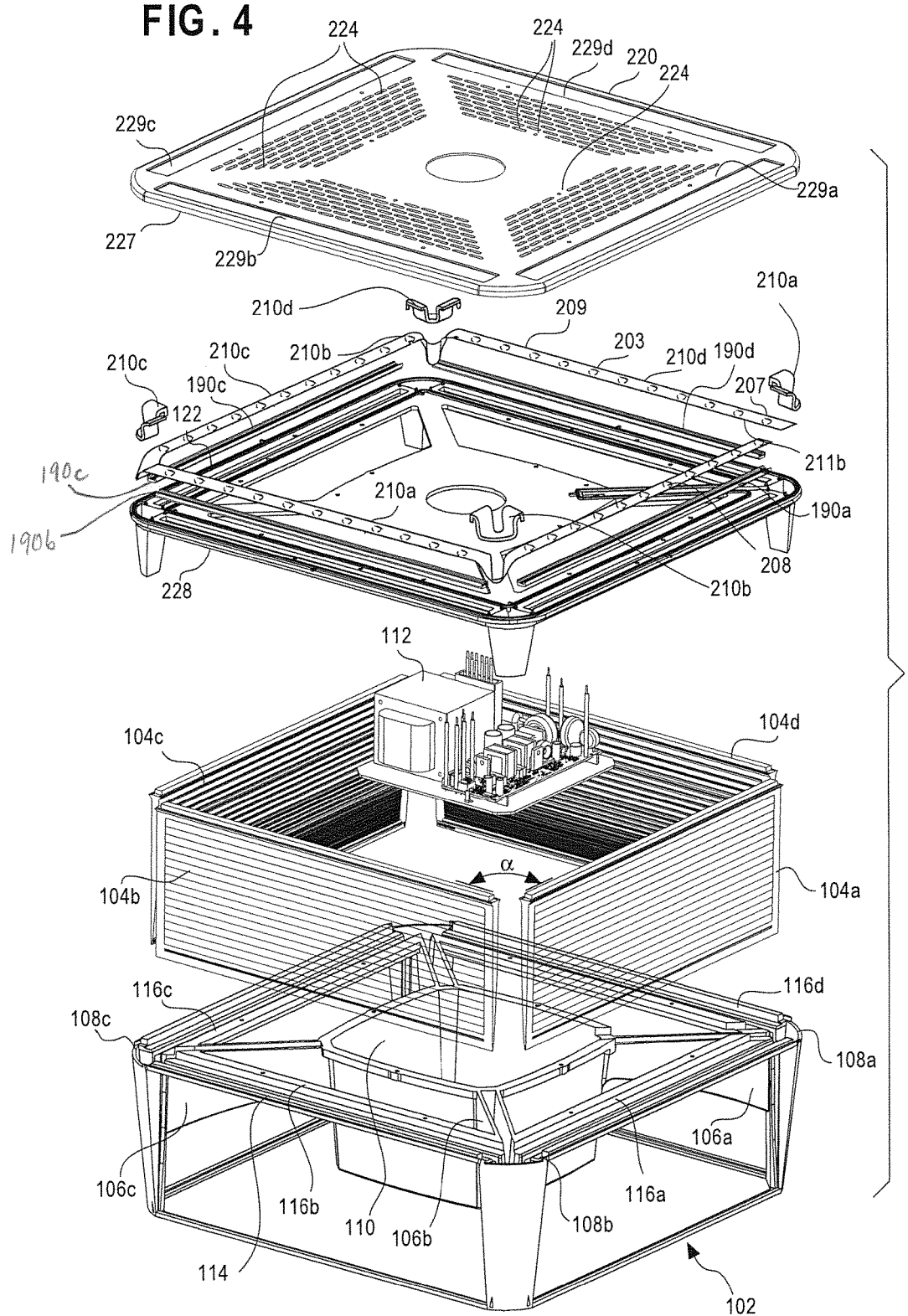
FIG. 4 is an exploded view of the embodiment of FIGS. 1 and 2.

As seen in FIGS. 3 and 4, the auxiliary frame 122 is secured to the main frame 114 by fasteners, such as screws 170, that extend through bores 180 in the auxiliary frame 122 into aligned threaded bores 182 in the main frame 114. A downwardly extending shouldered seal section 184 that carries the lower seal members 133a, 133b, 134a, 134b, 135c, 135c, and 136a, 136b extends into a complementarily-shaped channel 186 in the main frame such that the seal members 133a, 133b, 134a, 134b, 135c, 135c, and 136a, 136b bear and seal against the enlarged tapered portions 104a-1, 104b-1, 104c-1, and 104d-1. Further, the seal members 133a, 133b, 134a, 134b, 135c, 135c, and 136a, 136b bear and seal against a base surface 188 of the channel 186. Elongate optical components in the form of optical coupling members 190a-190d are thereafter inserted into the upper portions 151a-151d of the channels 130a-130d, respectively, into contact with the planar top ends 104a-2, 104b-2, 104c-2, and 104d-2. Referring to FIG. 4, the optical coupling members 190 may be made of the same suitable optical material, such as liquid silicone rubber, optical grade acrylic, air, polycarbonate, molded silicone, glass, and/or cyclic olefin copolymers, and combinations thereof, and are preferably (although not necessarily) substantially or completely identical to one another. Accordingly, only the optical coupling member 190a will be described in detail. As seen in FIG. 12, the optical coupling member 190a includes at least one refractive portion 190a-1 and at least one, and preferably, a plurality of reflective portions 190a-2 wherein the refractive portion(s) 190a-1 and reflective portion(s) 190a-2 are both disposed at an upper end 190a-3. The optical coupling member 190a is preferably elongate in length between first and second ends of the member 190a and has a width transverse to and substantially smaller than the length extending between first and second sides. In other embodiments, the optical coupling member may have any other shape such as circular or rounded. For example, a plurality of rounded coupling members may be disposed adjacent a plurality of LED components. In any event, an increase in the proportion of reflected light to refracted light may result in a desirable decrease in imaging of the light sources (i.e., the ability to see the individual light source(s) from outside of the luminaire 100). Further, the optical coupling member 190a further includes a main body 190a-4 having a tapered outer surface 190a-5 terminating at a planar bottom surface 190a-6. In one embodiment, the material of the optical coupling member 190a is preferably somewhat sticky so that the planar bottom surface 190a-6 adheres to and forms an optically transmissive bond with the planar top end 104a-2 of the waveguide 104a. In another embodiment, the optical coupling member 190a may comprise an acrylic material such as poly(methyl methacrylate) (PMMA) that is overmolded onto or otherwise optically coupled to the acrylic waveguide 104a during fabrication. In a further embodiment, the optical coupling member 190a and the waveguide 104a may be fabricated as a unitary piece of a single material using procedures such as hot embossing or molding, including injection/compression molding, or other suitable methods. Further, the tapered outer surface 190a-5 preferably, but not necessarily, contacts the tapered portion 152a of the channel 130a when the optical coupling member 190a is fully inserted therein.

Preferably, the remaining optical coupling members 190b, 190c, and 190d include elements 190b-1 through 190b-6, 190c-1 through 190c-6, and 190d-1 through 190d-6 that correspond to the elements 190a-1 through 190a-6, respectively and are disposed within the channels 130b, 130c, and 130d in the same fashion as described above with respect to the placement of the optical coupling member 190a in the channel 130a with respect to the waveguide 104a. Referring to FIG. 4, in the illustrated embodiment, at least one, and more preferably more than one, LED elements or modules 105 are mounted on exposed conductive portions 202a-202d of a continuous flexible circuit element in the form of a flexible conductor 203 wherein the conductor 203 is disposed atop and spans respective portions 204a-204d of the upper face 132 adjacent and on either sides of the channels 130a-130d, respectively, of the auxiliary member 122 and wherein the LED elements or modules 105 emit light toward the optical conducting members 190. The flexible circuit element may include one or more layers of aluminum and/or copper.

As seen in FIG. 4, in one embodiment, the flexible conductor 203 includes first and second ends 207, 208, respectively, and an intermediate portion 209 comprising sections 210a, 210b, 210c, and 210d separated by corner loops 211a, 211b, and 211c. In the illustrated embodiment, the intermediate portion 209 extends fully about the luminaire 100 such that the sections 210a-210d overlie the channels 130. Also, each of the four nesting portions 124a-124d is preferably hollow and the corner loops 211a, 211b, and 211c are placed into the nesting portions 124a, 124b, and 124c, respectively, and the ends 207, 208 are disposed adjacent the nesting portion 124d. Corner clips 210a-210c are inserted into the nesting portions 124a-124c, respectively, and retained therein, such as by an interference or press fit, so that the loops 211a-211c are retained in the nesting portions 124a-124c and are anchored by the clips 210a-210c. In addition, wires 214 extend through a notch 215 in the walls defining the enclosure 110 and an aperture 216 and a channel 218 formed in the arm 126c of the auxiliary frame 122 between the central enclosure 110 and the nesting portion 124c where electrical connections are made to the flexible conductor 203 in any suitable fashion.

Figure 2:
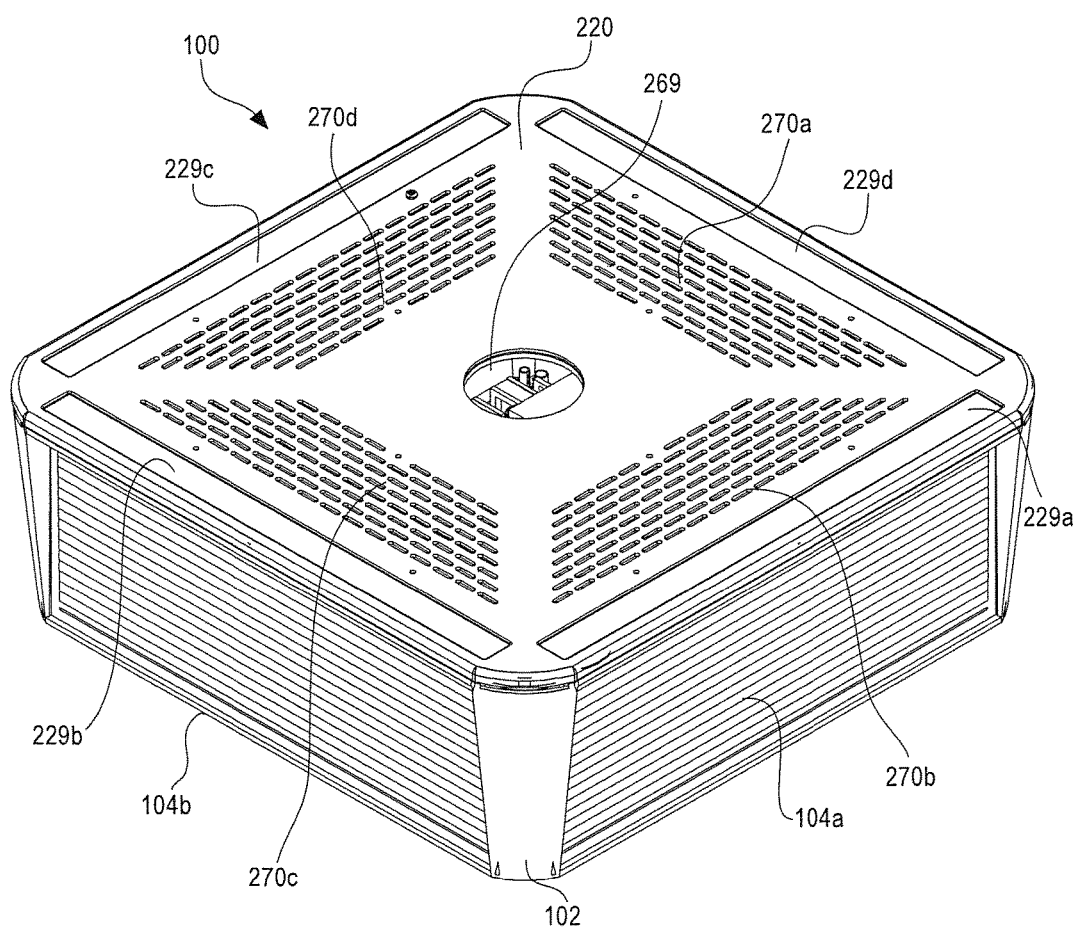
FIG. 2 is an isometric view from above of an embodiment of a luminaire.

A combination cover and heat transfer member 220 is secured to the auxiliary frame 122 by fasteners, such as screws 222 that extend through apertures 224 into threaded bores 226 in the auxiliary frame 122. The cover 220 includes a downwardly directed peripheral flange 227 that overhangs a shouldered peripheral portion 228 of the auxiliary frame 122. The cover 220 is preferably made of a thermally conductive corrosion-resistant material, such as aluminum, stainless steel, or any other suitable material. As seen in FIGS. 2 and 4, the cover 220 includes inwardly directed portions 229a-229d that are in thermal contact with upper surfaces of the flexible conductor 203 at the sections 210a-210d so that heat developed by the LEDs 105 is efficiently transmitted through the flexible conductor 203 and the cover 220 to ambient surroundings. Further, when the cover 220 is secured to the auxiliary frame 122, the seal members 140, 142, 144 and 146, 148, 150 contact and seal against inner surfaces 230 of the cover 220 on either sides of the sections 210a-210d. The seals 140a, 140b, 141a, 141b, 142a, 142b, and 143a, 143b as well as the seals 133a, 133b, 134a, 134b, 135c, 135c, and 136a, 136b and the peripheral flange 227 provide environmental barriers preventing exposure of components to water, dust, other contaminants, etc.

Referring to FIG. 3 the optical coupling members 190 substantially collimate the primarily lambertian distribution of light developed by each LED 105 and direct such light into the waveguides 104. Specifically, FIG. 12A illustrates an embodiment that includes a single refractive portion 190a-1 and two groups of reflective portions 190a-2a and 190a-2b. Also in the illustrated embodiment, each group of reflective portions 190a-2a and 190a-2b includes four reflective portions arranged on either side of the refractive portion 190a-1 in an arrangement that is symmetric about a center line CL equidistant from the first and second sides of the member 190a. The light developed by an LED element or module 105a is incident on the refractive portion 190a-1 and the reflective portions 190a-2. The light incident of the refractive portion 190a-1 is collimated and transmitted into the associated waveguide 104a wherein the degree of collimation is determined by a number of factors, including the shape of an interface surface 240 of the refractive portion 190a-1. Preferably, although not necessarily, the interface surface 240 is convex in shape (i.e., a center or middle portion of the surface 240 defined by the material of the coupling member 190a is disposed closer to the LED 105a than outer ends thereof) and further is arcuate, and, more particularly, preferably has a partial circular shape, in cross section. Still further, the reflective portion 190a-2 comprises a plurality of ridges 242a, 242b, 242c, ..., 242N separated from one another by intervening troughs 244a, 244b, 244c, ..., 244M. Each ridge 242, for example, the ridge 242a, is defined by an inner surface 246 parallel to the center line CL and an outer surface 248 that is inclined relative to the center line CL and that join one another at a sharp corner. As shown by the rays of FIG. 12A, the light incident on the inner surfaces 246 is refracted at the index interfaces at such surfaces and the refracted light rays travel through the material of the optical coupling member 190a and reflect off the outer surfaces 248 according to principles of total internal reflection and are directed in a substantially collimated fashion into the associated waveguide 104a. The degree of collimation is dependent upon a number of factors, including the geometries of the surfaces of the reflective portions 190a-2. Also, optical efficiency and light distribution are improved by ensuring that the surfaces of the ridges meet at sharp corners. In the illustrated embodiment shown in FIGS. 10, 11, 12, and 12B, each optical coupling member 190 and waveguide 104 has the dimensions recited in the following table, it being understood that the dimensions are exemplary only and do not limit the scope of any claims herein, except as may be recited thereby, together with equivalents thereof:

TABLE 1

| FIG. 12B | |
|---|---|
| A | 8 mm |
| B | 6.5 mm |
| C | 5.38 mm |
| D | 2.78 mm |
| F | 1.18 mm |
| G | 4 mm |
| H | 2.88 mm |
| J | 2.36 mm |
| K | 2.06 mm |
| M | 1.39 mm |
| N | 0.96 mm radius of curvature |
| FIG. 10 | |
| P | 304.55 mm |
| Q | 296.80 mm |
| R | 6.35 mm |
| S | 110.63 mm |
| FIG. 11 | |
| T | 312.42 mm |
| U | 296.80 mm |
| V | 298.59 mm |
| W | 7 mm |
| Z | 28.58 mm |
| Y | 57.15 mm |

TABLE 1-continued

| | |
|---|---|
| Z | 85.73 mm |
| AA | 115.78 mm |
| FIG. 12 | |
| AB | 123.72 mm |
| AC | 0.5 degrees |
| AD | 4.0 degrees |
| AE | 2.0 degrees |
| AF | 1.0 degrees |
| AG | 0.5 degrees |

Figure 22:
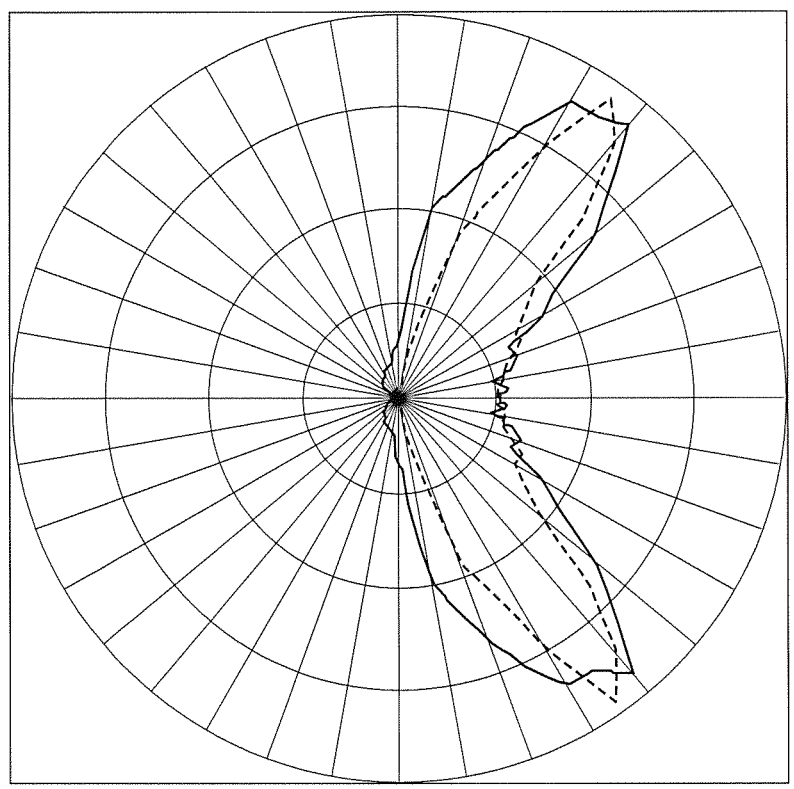
FIG. 22 is an illumination distribution produced by the luminaire of FIG. 1.

Thus, light incident on the refractive portions 190a-1 and the reflective portion 190a-2 is collimated and directed into the waveguide 104a. The extraction features 104a-7 of the waveguide 104a cause the light injected into the waveguide 104a to exit the front surface 104a-9 and the scalloped features 104a-15 spread the light up and down. The remaining optical coupling members 190b-190d and the waveguides 104b-104d inject, transmit, and extract light developed by the LEDs 105 mounted on conductive portions of the sections 210b-210d of the flexible conductor 203 in the same fashion as the optical coupling member 190a and the waveguide 104a. The overall result, when the LEDs 105 are energized, is to produce a desired illumination distribution, for example, as illustrated by the simulation illumination diagram of FIG. 22. In the illustrated diagram, the distribution produced along a plane forming a 90° angle relative to two opposing waveguides 104 is shown with a dashed line. The distribution produced along a plane extending through two opposing corners 108 is shown with a solid line. A portion of the light is directed above the luminaire 100.

In further alternative embodiments, the waveguides 104 and coupling members 190 may be produced in any suitable fashion and placed into a mold and a frame may be molded about the waveguides 104 and coupling members 190. In such an embodiment the auxiliary frame 122 may not be needed.

If desired, the flexible circuit conductor 203 may include a surface 260 adjacent the LED elements or modules 105 that has a white or specular reflective coating or other member secured or otherwise applied thereto.

Referring next to FIGS. 14-21, the cover 220 is adapted to be secured to any one of various devices so that the luminaire can be suspended from a ceiling, for example, of a parking deck or garage, or the luminaire can be pendant mounted, or mounted on other devices, such as a trunnion, junction box, pole, etc. Specifically, the cover 220 is generally planar and includes a central opening 269 and a plurality (such as four) arcuate slots 270a-270d (FIG. 13) surrounding the central opening 269 wherein each slot 270a-270d has an enlarged opening 272a-272d, respectively. A mounting plate 274 includes a central section 276 having a central aperture 278 and a plurality of combined arcuate and radial slots 280a-280d that surround the central aperture 278. The mounting plate 274 further includes a plurality of tabs 282a-282d that is offset with respect to the remaining planar portions of the plate 274. Assuming for the sake of illustration that the luminaire is to be mounted to a junction box 290 (FIG. 14), the mounting plate 274 is mounted first to the junction box 290 with the tabs 282a-282d offset in a direction extending away from the junction box 290 using screws or other fasteners 292 that extend through two or more of the combined arcuate and radial slots 280a-280d into threaded bores in the junction box 290. The assembled luminaire 100 is thereafter suspended by one or more sections of, for example, aircraft cable or wire rope, from the junction box 290 (FIG. 14) and electrical connections are made to the operating circuitry 112 (FIG. 4) in the central enclosure 110 using conventional wire nuts or otherwise. The wires are tucked into the junction box 290 and the luminaire 100 is then raised such that the cover 220 is located adjacent the mounting plate 274. The luminaire is then manipulated such that the offset tabs 282a-282d are inserted into the enlarged openings 272a-272d of the arcuate slots 270a-270d. The luminaire 100 is then turned to move the tabs 282a-282d out of alignment with the enlarged openings 272a-272d and so that the tabs 282a-282d are disposed under sections 296a-296d at or near ends 298a-298d of the slots 270a-270d. A screw 299a is then threaded into a threaded bore 299b in the cover 220 to prevent further rotation of the luminaire 100 and to secure the luminaire 100 to the junction box 290. Further, other ways of securing the luminaire 100 to a junction box may be used. For example, the luminaire 100 of FIG. 14A may be mounted to the junction box 290 with gaskets 275a, 275b positioned between the junction box 290 and the mounting plate 274 and between the mounting plate 274 and the cover 220.

Figure 15:
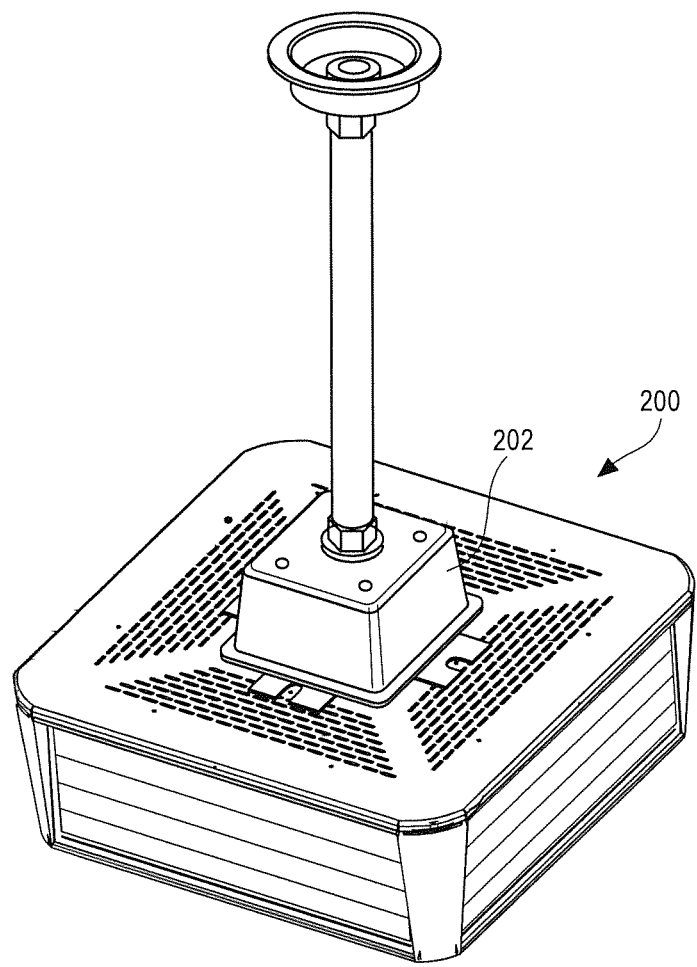
FIG. 15 is an isometric view of an embodiment of a pendant or pole mounted luminaire.
Figure 16:
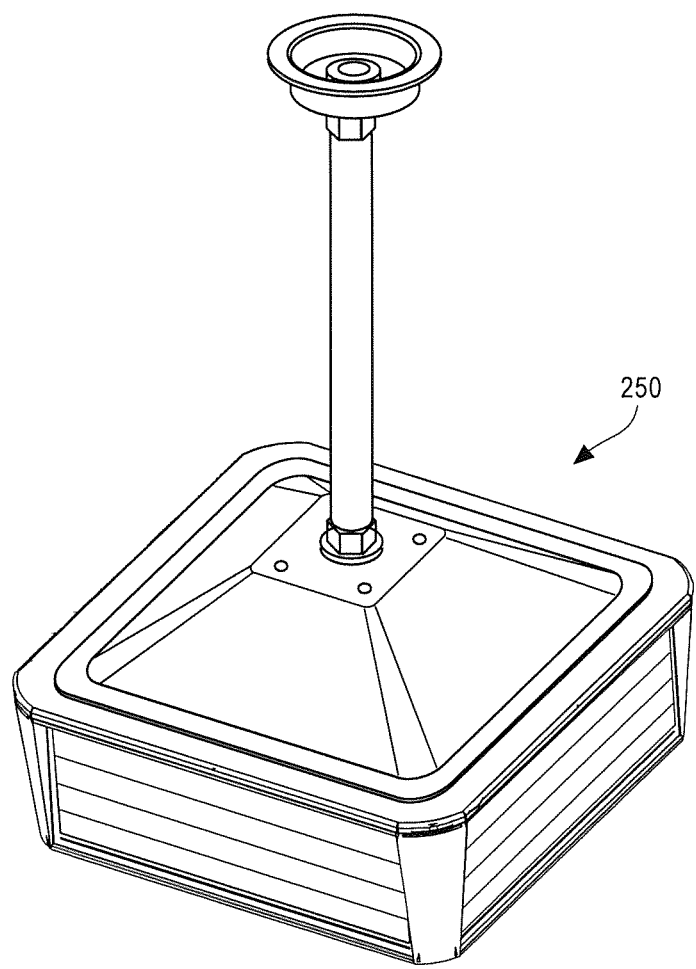
FIG. 16 is an isometric view of an embodiment of a pendant mounted luminaire with a bird guard.
Figure 17:
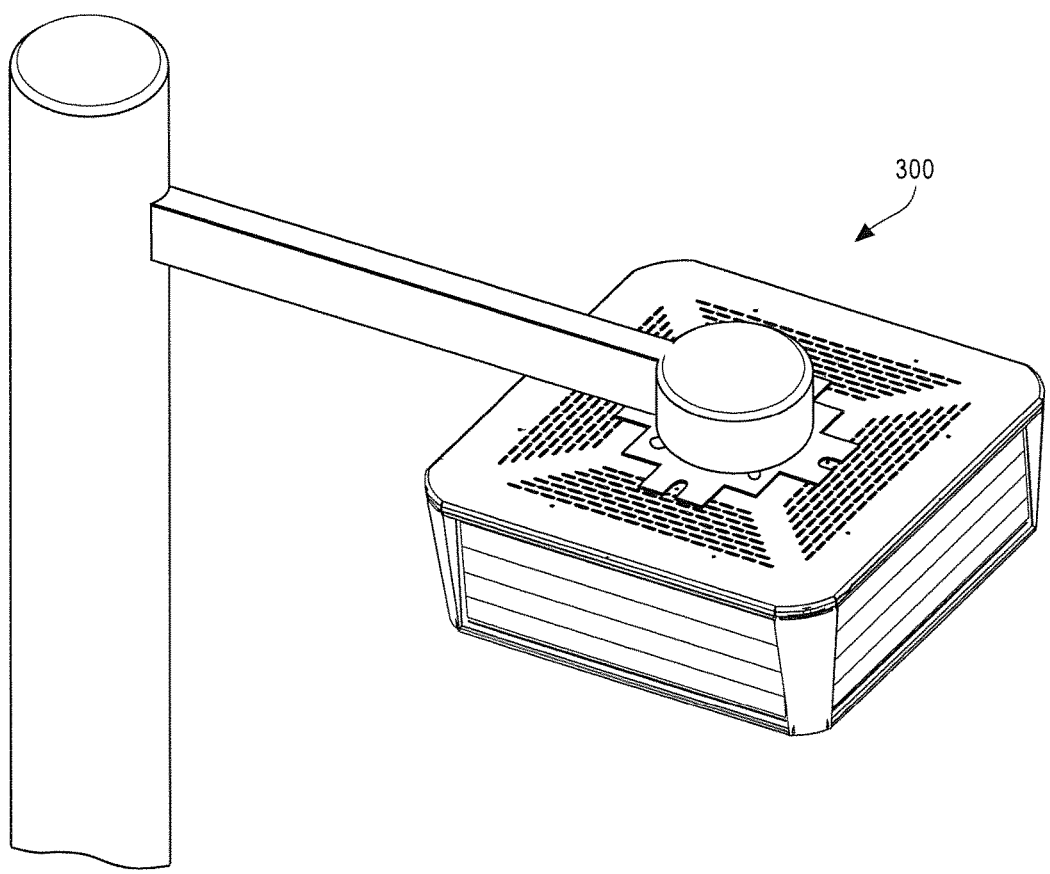
FIGS. 17 and 18 are top and bottom isometric views, respectively, of an embodiment of a post mounted luminaire.

As should be evident, the luminaire can be secured to other structures or elements using the mounting plate 274 or another suitable device. The luminaire can be mounted as a single unit, or may be mounted adjacent other luminaires in groups (FIGS. 15-21). Referring to FIG. 15, a luminaire 200 includes a bird guard 202 around the junction box (not shown). FIGS. 16-21 illustrate luminaires 250, 300, 350, 400, 450, and 500, respectively, in various mounting arrangements.

Figure 13:
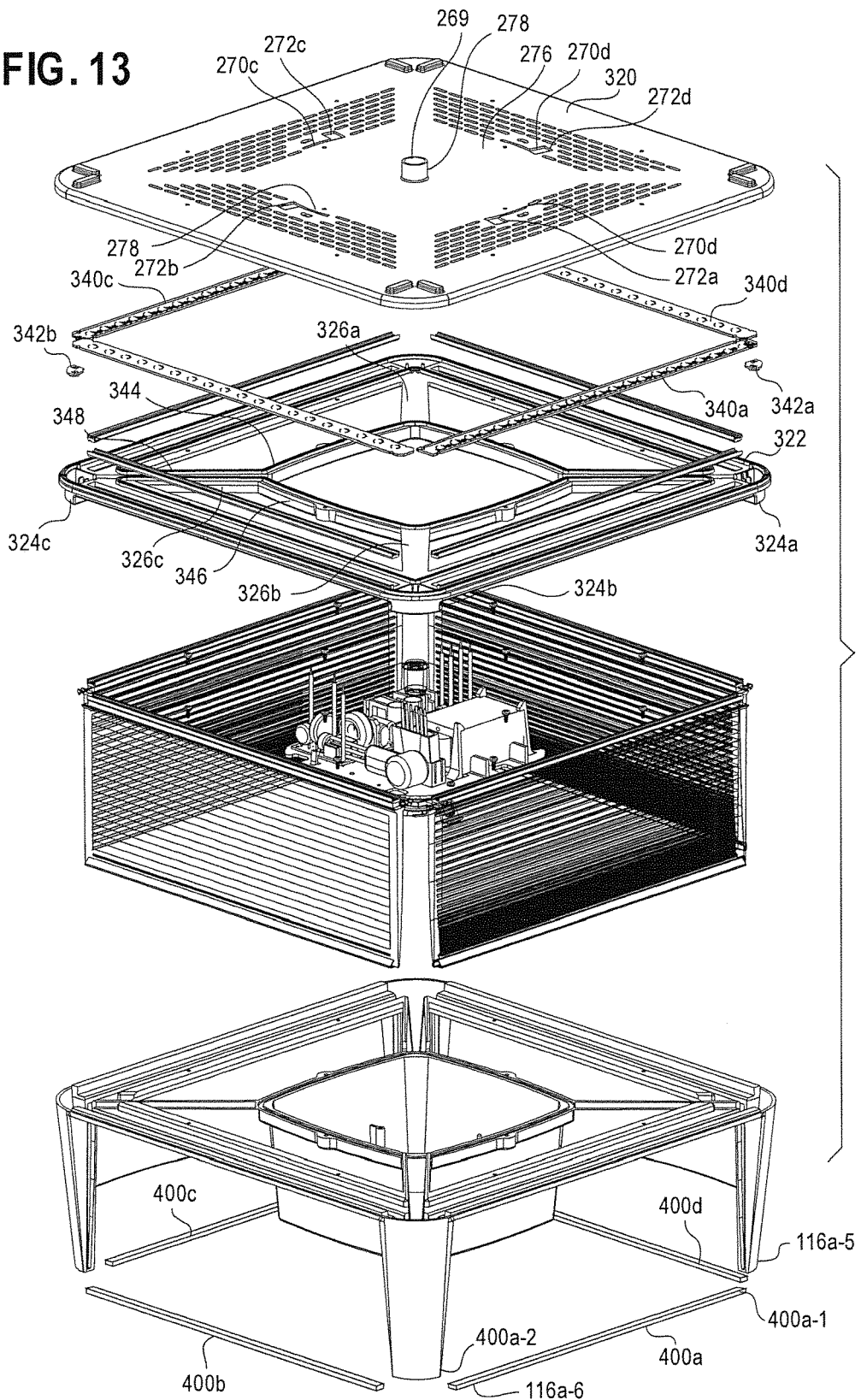
FIG. 13 is an exploded view of an alternative embodiment of a luminaire.
Figure 13A:
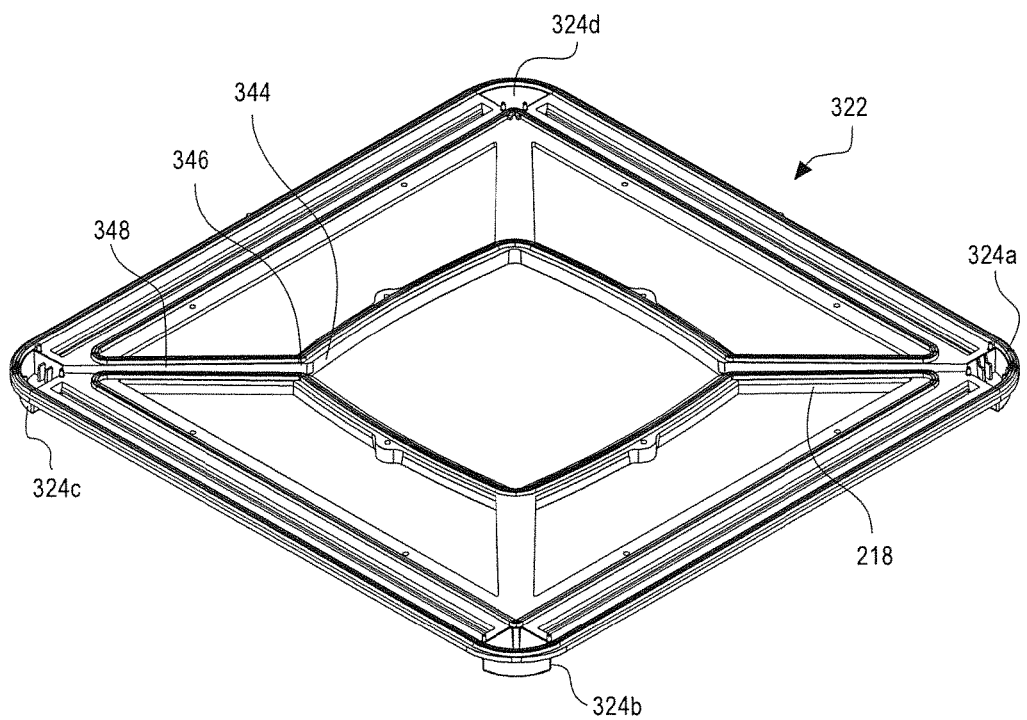
FIG. 13A is an isometric view of an alternative embodiment of the auxiliary frame of FIG. 13.
Figure 14:
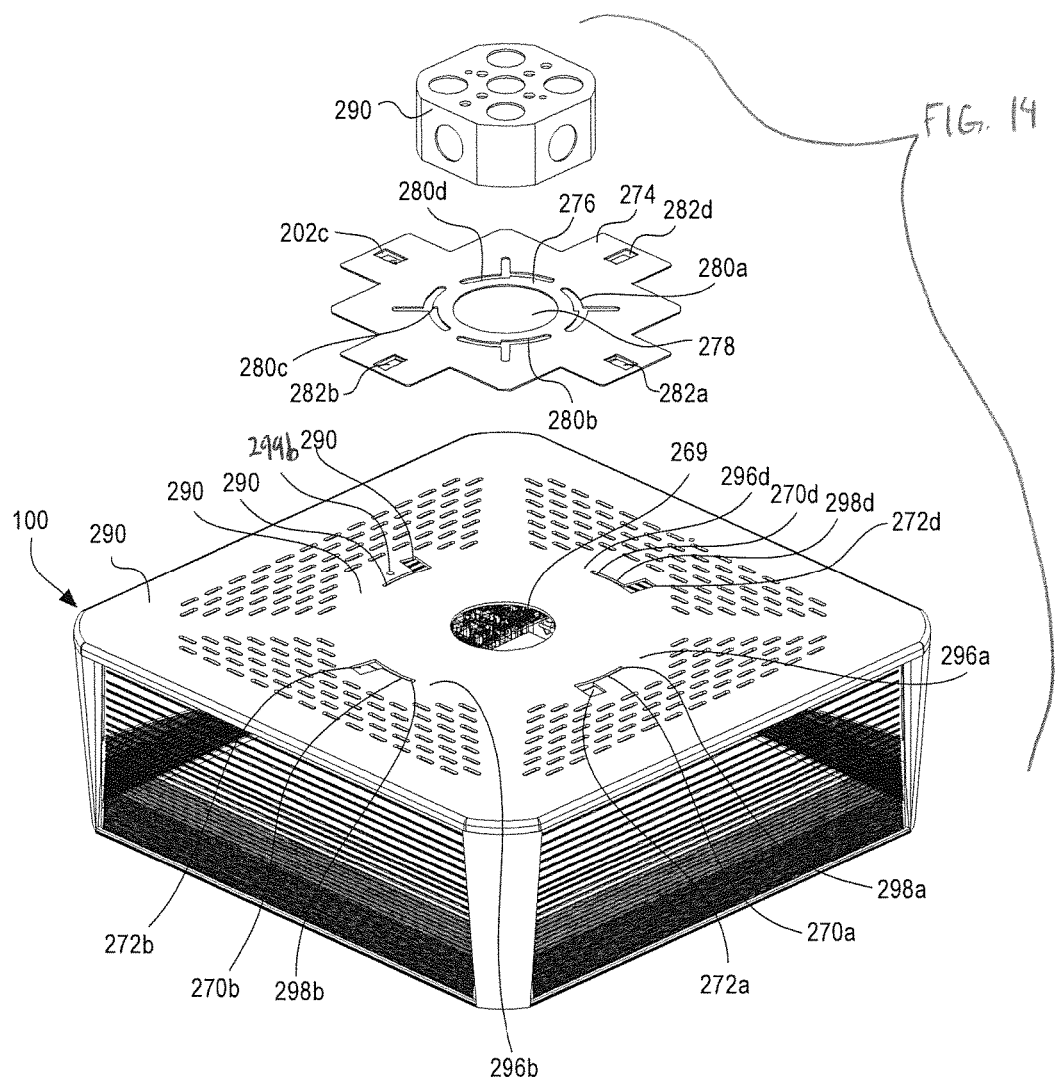

If desired, and as seen in FIG. 13A, the cover 220 may be provided without the central cover portion 127 of the auxiliary frame 122 shown in FIG. 7. In this case the cover 220 may be provided with seal members (not shown) forming a gasket that seals against upper surfaces of the central enclosure 110. Alternatively, if the central cover portion 127 is provided as shown in FIG. 7, a mounting collar (not shown) may be formed therewith or secured thereto. The mounting collar may extend upwardly through the central opening 129 of the cover 122. The collar may include a threaded radial hole to accept a set screw so that the luminaire may be secured to an overhanging vertical pole end (not shown) that is received in the collar.

Still further, the continuous flexible conductor 203 may be replaced by discontinuous flexible or rigid electrically conductive members. Thus, for example, as seen in FIG. 13, first through fourth circuit boards 340a-340d each of which includes the LED elements or modules 105 mounted thereon overlie the channels 130a-130d, respectively. In the illustrated embodiment, a further notch 344, an aperture 346, and a channel 348 like the notch 215, the aperture 216, and the channel 218 is provided diametrically opposite to channel 218 such that the channel 348 extends through the arm 126c of the auxiliary frame 322. Corner connectors 342a and 342b disposed in the nesting portion 324a and 324c may be provided to facilitate connection to the operating circuitry 112 in the central enclosure 110. Further corner electrical connectors (not shown) may be disposed and retained within the nesting portions 324b and 324d, respectively, and interconnect adjacent circuit boards 340a, 340b and 340c, 340d, respectively. In this arrangement, equal numbers of different circuit board and connector configurations can be produced and installed, as opposed to unequal numbers of different components, possibly leading to decreased fabrication costs. In another embodiment, electrical power may be supplied by wires extending from the central enclosure 110 through a single channel of the auxiliary frame 122, as described in the embodiment shown in FIGS. 4 and 7. In this case, corner electrical connectors 342a, 342b, and 342c are disposed and retained within the nesting portions 124a, 124b, and 124c and interconnect adjacent circuit boards 340a, 340b and 340b, 340c and 340c, 340d, respectively. The circuit boards 340a and 340b are interconnected by a corner electrical connector 352a identical to the corner electrical connectors 342a, 342b and disposed and retained within the nesting portion 124a.

If desired, the upstanding bottom walls 116a-7 through 116d-7 and the base surfaces 116a-8 through 116d-8 of the main frame 114 may be omitted and channel members 400a-400d (FIG. 13) may be substituted therefor that receive the bottom ends 104a-3 through 104d-3 of the waveguides 104a-104d, respectively. Ends 400a-1 and 400a-2 of the channel member 400a are slid into and are retained within bottom portions of the side channels 116a-5 and 116a-6. In like fashion the channel members 400b, 400c, and 400d are retained within the side channels 116b-5 and 116b-6, 116c-5 and 116c-6, and 116d-5 and 116d-6.

Figure 23:
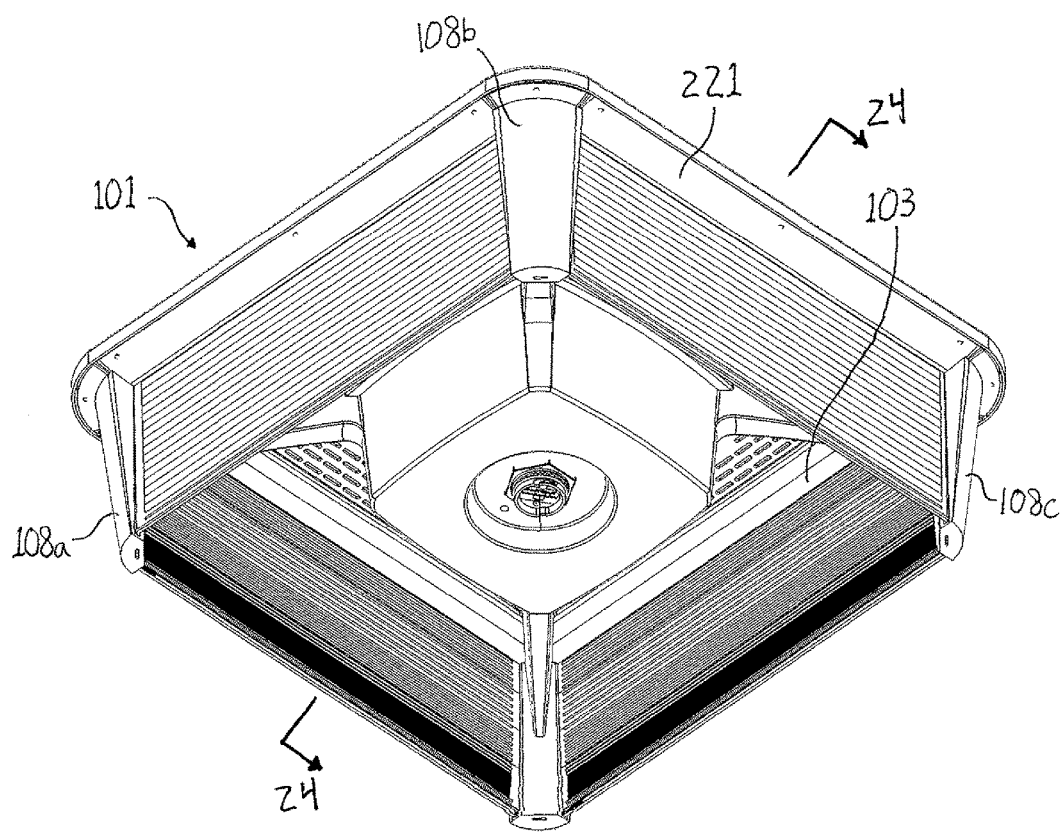
FIG. 23 is an isometric view from below of an embodiment of a luminaire.
Figure 24:
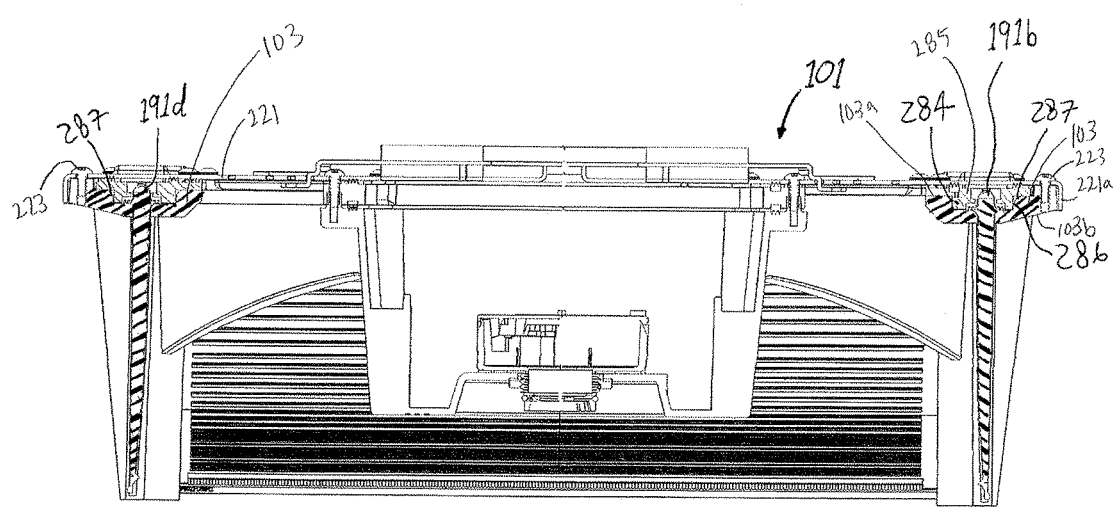
FIG. 24 is a sectional view taken generally along the lines 24-24 of FIG. 23.

FIGS. 23-29 illustrate a further embodiment of a luminaire 101 for general lighting, more particularly, for illumination of an open space and, specifically, a parking lot or parking deck of a garage. The luminaire 101 is identical to the luminaire 100 as shown in FIGS. 1-12C except for the differences noted below. Referring specifically to FIG. 23, the luminaire 101 comprises a housing 103 that includes support structures by which the luminaire 101 can be supported. As shown in FIG. 23, a combination cover and heat transfer member 221 is disposed on a first surface 103a of the housing 103 such that the cover 221 overhangs each of the corners 108a, 108c and 108b, 108d. Further, the outer edges 221a of the cover and heat transfer member 221 may extend downwardly even with or beyond a second surface 103b of the housing 103 opposite the first surface 103a as shown in FIG. 24 in order to improve weather resistance. The addition of this downwardly-extending flange tends to induce a slight bowing of the cover 221. Screws or other fasteners 223 adjacent the outer edges 221a of the cover and heat transfer member 221 may be used to secure the cover 221 to the frame 103 also for weather resistance. Further, downwardly protruding ribs or cavities 221b may be formed in the cover member 221 to stiffen and/or strengthen the cover member 221 and to augment the bowing of the cover 221. This increased stiffness and bowing of the cover 221 contribute to increased gasket compression about the channels through which the wires and the circuit boards extend, which results in improved weather protection of the electrical wiring and components therein.

Figure 25:
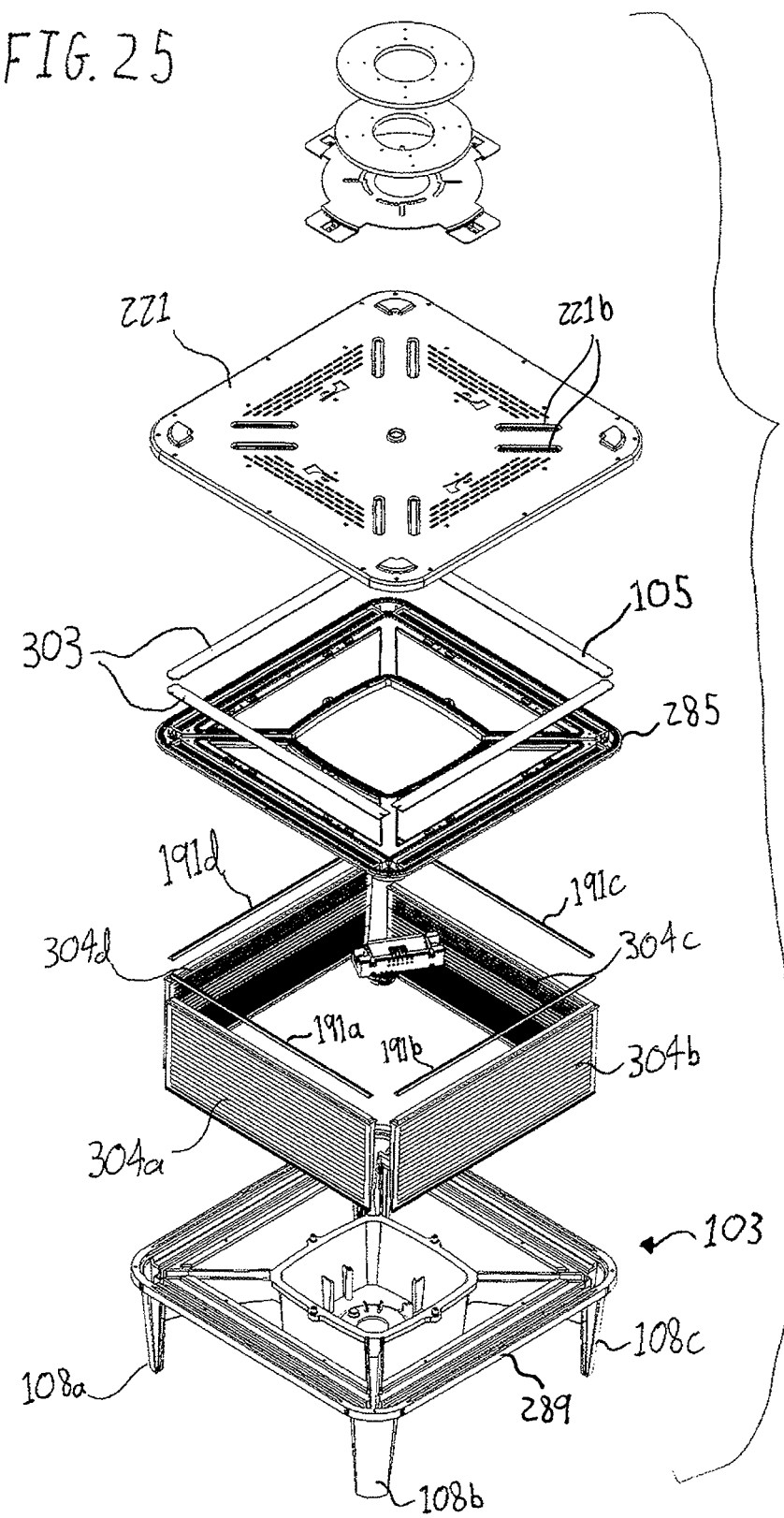
FIG. 25 is an exploded view of the embodiment of FIG. 23.
Figure 26:
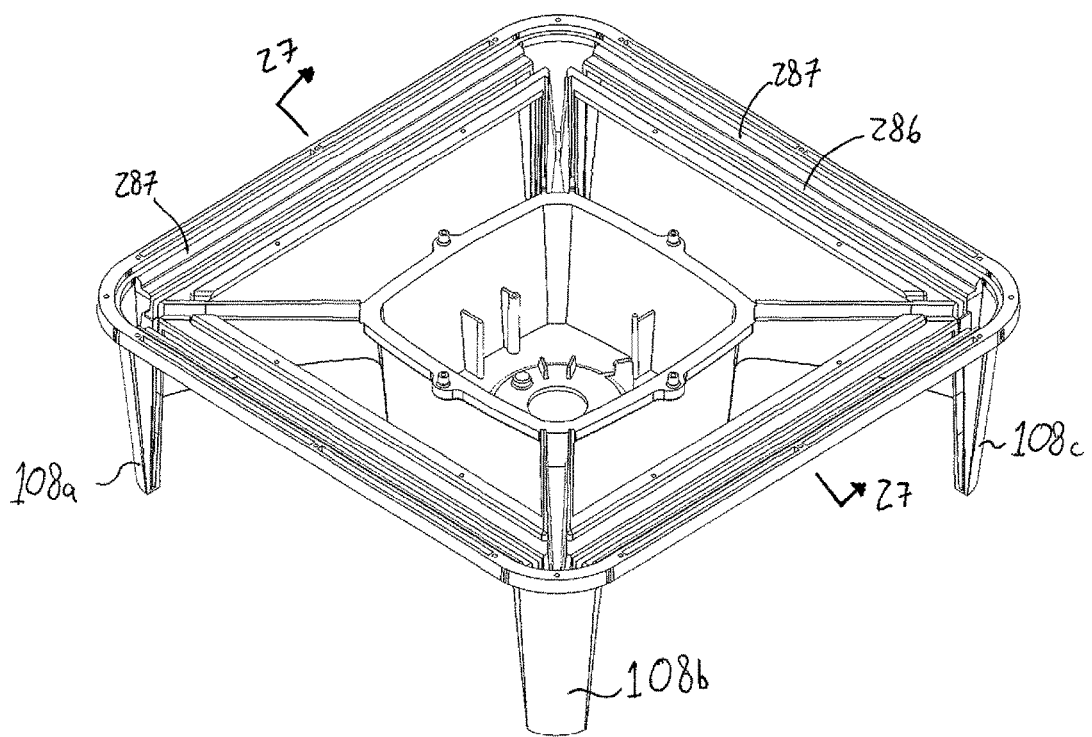
FIG. 26 is an isometric view of a main frame of the embodiment of FIG. 23.
Figure 27:
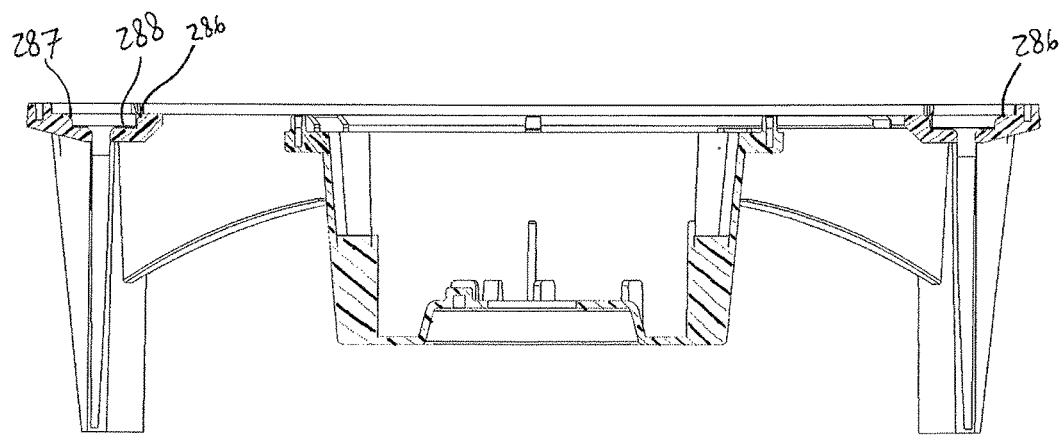
FIG. 27 is a sectional view of the main frame taken generally along the lines 27-27 of FIG. 26.
Figure 28:
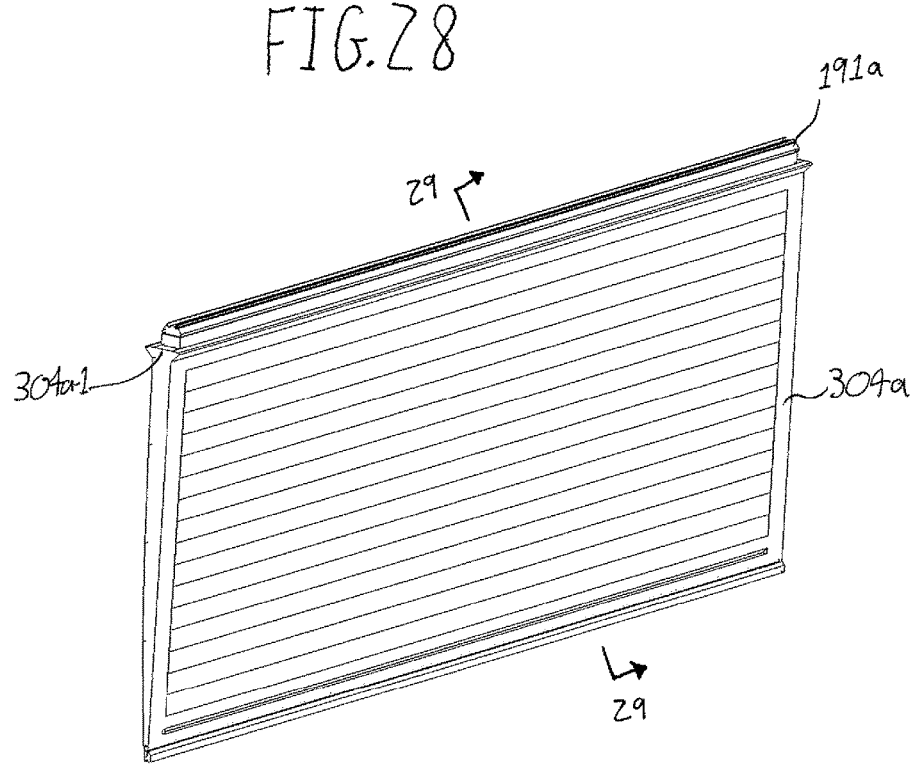
FIG. 28 is an isometric front view of one of the optical waveguides and coupling members of the luminaire of FIG. 23.

As shown in FIG. 25 at least one, and more preferably, a plurality of LED elements or modules 105 is mounted on one or more printed circuit boards 303. The circuit boards may be interconnected as described previously or may be interconnected in a different fashion. A downwardly extending shouldered seal section 284 (see FIG. 24) of the auxiliary frame 285 that carries the lower seal members 133a, 133b, 134a, 134b, 135c, 135c, and 136a, 136b (as shown in FIG. 9) extends into a complementarily-shaped channel 286 (see FIG. 24) in the main frame 289 such that the seal members 133a, 133b, 134a, 134b, 135c, 135c, and 136a, 136b bear and seal against the enlarged tapered portions 304a-1, 304b-1, 304c-1, and 304d-1. Further, the seal members 133a, 133b, 134a, 134b, 135c, 135c, and 136a, 136b bear and seal against a base surface 288 (see FIG. 27) of the channel 286. The surfaces defining the base surface 288 and the channel 286 may be rounded, or the surfaces may terminate at a corner. As shown in the embodiment depicted in FIG. 24, a surface 287 defining the channel 286 may be rounded.

In the embodiment shown in FIGS. 24-31, optical coupling members 191a, 191b, 191c, and 191d are disposed adjacent to waveguides 304a, 304b, 304c, and 304d, respectively. In the illustrated embodiment, the optical coupling members 191 are preferably (although not necessarily) identical to one another, and hence only the optical coupling member 191a is described in detail herein. In the embodiment illustrated in FIG. 30, the member 191a includes a single refractive portion 191a-1 and at least one, and preferably a pair of, spaced reflective portions 191a-2 and 191a-3 disposed on either side of the refractive portion 191a-1. The refractive portion(s) 191a-1 and reflective portion(s) 191-2 are all disposed at an upper end 191a-4 of the member 191a. The optical coupling members 191 may be made of the same suitable optical material, such as liquid silicone rubber, optical grade acrylic, air, polycarbonate, molded silicone, glass, and/or cyclic olefin copolymers, and combinations thereof. Each of the optical coupling members 191a through 191d is optically coupled to an associated waveguide 304a through 304d, respectively (i.e., there is no air gap between each optical coupling member 191 and the waveguide 304 associated therewith).

Further in the illustrated embodiment, the reflective portions 191a-2 and 191a-3 are arranged on either side of the refractive portion 192a-1 in an arrangement that is symmetric about a center line CL-2 equidistant from the first and second sides of the member 191a. The light developed by an LED element or module 105a is incident on the refractive portion 192a-1 and the reflective portions 191a-2 and 191a-3. The light incident on the refractive portion 192a-1 is collimated and transmitted into the associated waveguide 304a wherein the degree of collimation is determined by a number of factors, including the shape of an interface surface 343 of the refractive portion 192a-1.

Figure 29:
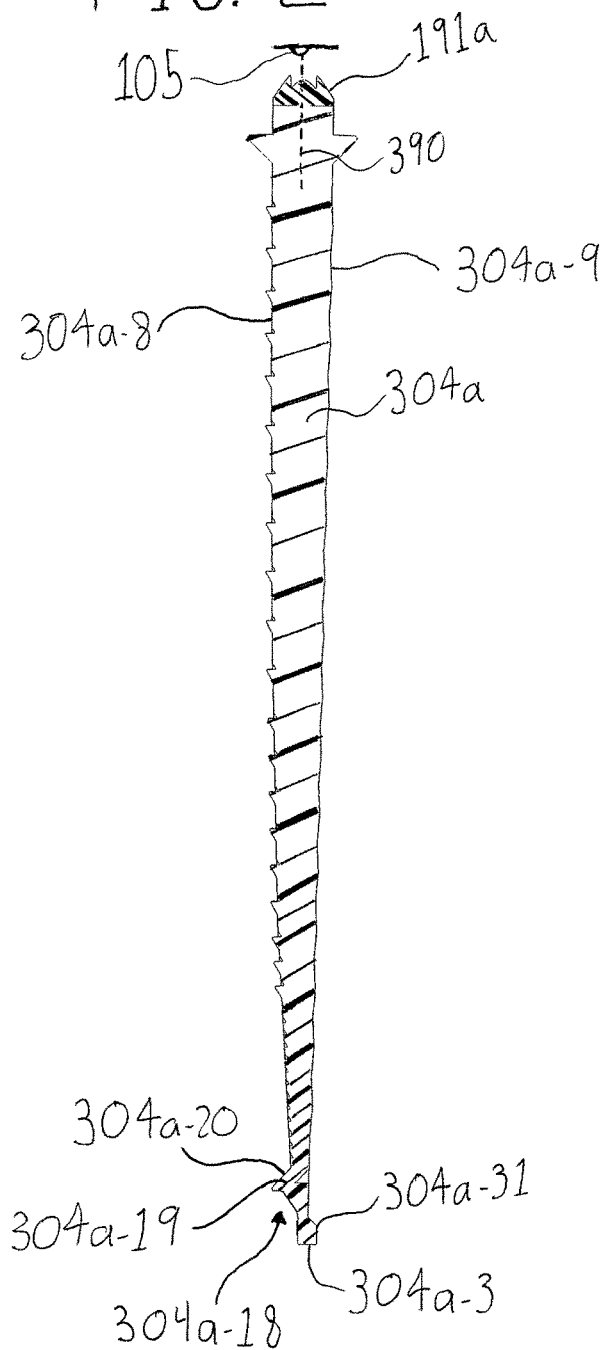
FIG. 29 is a sectional view taken generally along the lines 29-29 of FIG. 28.
Figure 30:
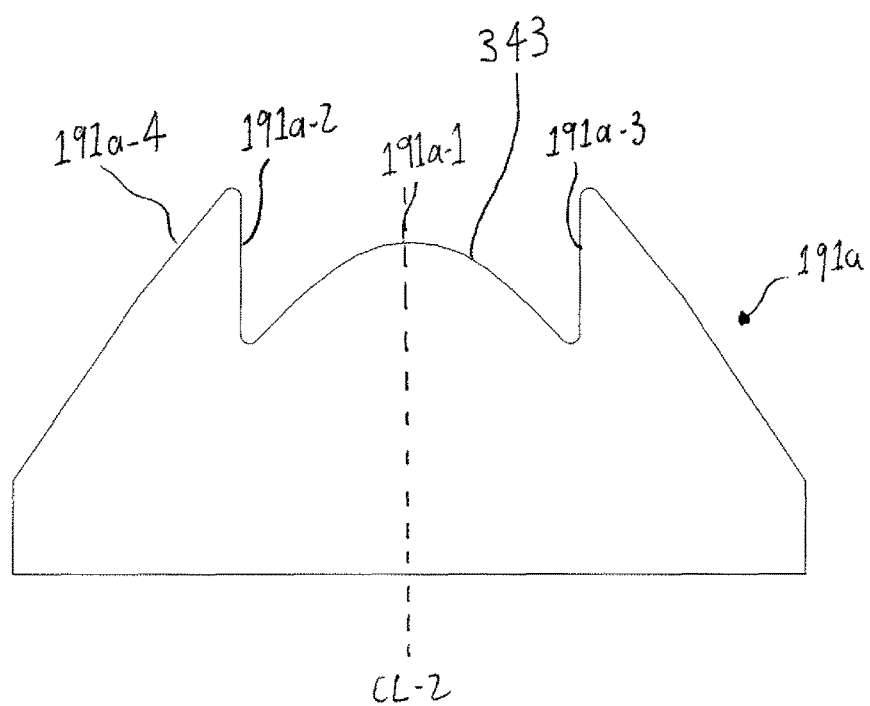
FIG. 30 is an enlarged, side elevational view of the coupling member of FIG. 28.
Figure 31:
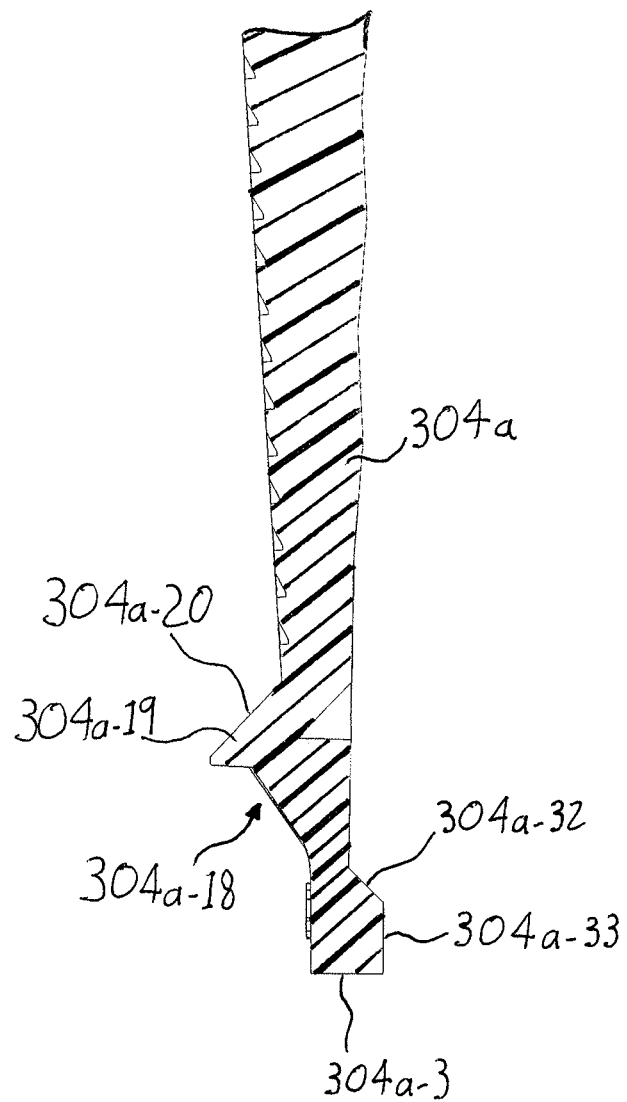
FIG. 31 is an enlarged, fragmentary sectional view of the optical waveguide of FIG. 28.

FIG. 29 illustrates that the LED element 105 may be placed directly above a centerline 390 of the coupling optic member 191, or the LED element may be placed somewhat off center, depending on the desired light distribution through the waveguide 304. Referring to FIGS. 29 and 31, the waveguides 304a through 304d are preferably (although not necessarily) identical to one another, and hence, only the waveguide 304a is described in detail herein. The waveguide 304a is identical to the waveguides described above, with the exceptions noted below. The waveguide 304a includes an end light extraction feature 304a-18 disposed adjacent a bottom end 304a-3. The end light extraction feature 304a-18 includes an elongate wedge-shaped protrusion 304a-19 disposed in or on a rear surface 304a-8 wherein the protrusion 304a-19 includes a downwardly directed rounded crest portion 104a-20. The end light extraction feature 304a-18 further includes an elongate wedge-shaped channel 304a-21 disposed on or in a front surface 304a-9.

In the embodiment illustrated in FIG. 29, the bottom end 304a-3 comprises an additional bottom protrusion 304a-31. The bottom protrusion 304a-31 is disposed on or in the front surface 304a-9 and, in the embodiment shown, the bottom protrusion 304a-31 is defined by a first surface 304a-32 extending outward from the front surface 304a-9 and is further defined by a second surface 304a-33 extending from the first surface 304a-32 to the bottom end 304a-3. The bottom protrusion 304a-31 may or may not be included as a component of the waveguide 304a, and the surfaces defining the bottom protrusion 304a-31 may have any shape, and may include additional surfaces. In some embodiments, the bottom protrusion 304a-31 may provide structural support. Further, channeled receptacles for receiving the waveguides 304a-304d are omitted from the embodiment described herein.

In summary, the plurality of waveguides is disposed on the housing. A flex conductor or circuit boards are placed adjacent the top edges of the waveguides and the flex conductor or circuit boards are enclosed by a cover that acts as a heat sink.

The housing and lid along with an integrated seal join the four (or a different number of) waveguides that make up the sides of the luminaire and integrate the enclosure for the power supply, sensor, operating circuits, and wire connection area. The continuous flex conductor or circuit boards present the LEDs to the waveguide coupling members, and avoids the need for wire harnesses at each corner. This allows for minimal use of materials resulting in a low cost luminaire.

The housing provides a unique aesthetic in which optical waveguides serve as the side walls of the luminaire. Material and costs associated with the luminaire are minimized. The design results in superior lighting with minimal glare. The optic feature of the fixture is integrated into the main housing, which results in a more robust structure and aids in the sealing between components.

The waveguide optics are used in this design to achieve high lumen output with low glare. This is accomplished by directing the light downward at an angle and spreading the illumination across a large area. The light from the LED's is pointed directly into each waveguide as opposed to being bounced off a reflective surface of a reflector (i.e., indirect illumination). This optical solution is more efficient than current indirect systems and allows the glare value to be adjusted by changing the illuminated area.

In an embodiment, each waveguide is made of optical grade acrylic and the LED's are optically coupled to the waveguide using a liquid silicone rubber ("LSR") member or other member. The LSR is shaped to serve as the entrance geometry for the optical system by directing light from the LED's directly into the waveguide.

If desired, the waveguides (with or without the optical coupling members) may be insert molded with the housing, thereby making the waveguide and housing a singular piece and eliminating the need for seals between the waveguides and the housing. This reduces assembly time and makes for a more robust luminaire structure. In a specific version of the embodiment, a thermoplastic elastomer ("TPE") seal is molded onto the housing to seal the fixture and protect the LED's and related circuitry from the environment. In yet another embodiment, the TPE seal is molded onto a top plate or lid that is placed on top of the housing.

The housing also includes a mounting plate that adds additional strength to the housing. In an embodiment, the mounting plate is made out of a metallic material and is molded into the plastic housing to strengthen the area of the fixture where it is mounted. In yet another embodiment, the mounting plate is molded into a plastic cover member or lid.

The luminaire multifunctional housing can be used with several installation options (e.g., pendant, trunnion, junction box, pole), as shown. The housing also results in ease of installation because the center section access is allowed from the top of the luminaire.

In an embodiment, the use of plastic avoids the need for post processing such as painting and the application of other expensive coating systems to protect the luminaire from the environment. In an embodiment, the lid is made out of sheet metal so that it can be used as a heat sink and, therefore, does not require painting or coating, unlike a metal casting. In still another embodiment, the lid can be made of plastic or the sheet metal lid can be overmolded with plastic to create mounting features.

Any of the embodiments disclosed herein may include a power circuit that may further be used with light control circuitry that controls color temperature of any of the embodiments disclosed herein in accordance with viewer input such as disclosed in U.S. patent application Ser. No. 14/292,286, filed May 30, 2014, entitled "Lighting Fixture Providing Variable CCT" by Pope et al. incorporated by reference herein.

Further, any of the embodiments disclosed herein may include one or more communication components forming a part of the light control circuitry, such as an RF antenna that senses RF energy. The communication components may be included, for example, to allow the luminaire to communicate with other luminaires and/or with an external wireless controller, such as disclosed in U.S. patent application Ser. No. 13/782,040, filed Mar. 1, 2013, entitled "Lighting Fixture for Distributed Control" or U.S. Provisional Application No. 61/932,058, filed Jan. 27, 2014, entitled "Enhanced Network Lighting" both owned by the assignee of the present application and the disclosures of which are incorporated by reference herein. More generally, the control circuitry includes at least one of a network component, an RF component, a control component, and a sensor. The sensor may provide an indication of ambient lighting levels thereto and/or occupancy within the illuminated area. Such sensor may be integrated into the light control circuitry and may cause the luminaire to adjust output lighting levels as a function of ambient light levels and/or detected motion.

INDUSTRIAL APPLICABILITY

In summary, the disclosed luminaire provides an aesthetically pleasing, sturdy, cost effective lighting assembly for use in lighting a large area such as a parking lot or deck of a parking garage. The lighting is accomplished with reduced glare as compared to conventional lighting systems.

The extraction features disclosed herein efficiently extract light out of the waveguide. At least some of the luminaires disclosed herein are particularly adapted for use in installations, such as, replacement or retrofit lamps, outdoor products (e.g., streetlights, high-bay lights, canopy lights), and indoor products (e.g., downlights, troffers, a lay-in or drop-in application, a surface mount application onto a wall or ceiling, etc.) preferably requiring a total luminaire output of at least about 800 lumens or greater, and, in some embodiments, a total luminaire output of at least about 7000 lumens, although the total luminaire output depends in part on the desired application. Further, the luminaires disclosed herein preferably have a color temperature of between about 2500 degrees Kelvin and about 6200 degrees Kelvin, and more preferably between about 2500 degrees Kelvin and about 5000 degrees Kelvin, and most preferably between about 4000 degrees Kelvin and about 5000 degrees Kelvin. Also, at least some of the luminaires disclosed herein preferably exhibit an efficacy of at least about 100 lumens per watt, and more preferably at least about 120 lumens per watt. Further, at least some of the optical coupling members and waveguides disclosed herein preferably exhibit an overall efficiency (i.e., light extracted out of the waveguide divided by light injected into the waveguide) of at least about 90 percent. A color rendition index (CRI) of at least about 70 is preferably attained by at least some of the luminaires disclosed herein, with a CRI of at least about 80 being more preferable. Any desired particular output light distribution, such as a butterfly light distribution, could be achieved, including up and down light distributions or up only or down only distributions, etc.

When one uses a relatively small light source which emits into a broad (e.g., Lambertian) angular distribution (common for LED-based light sources), the conservation of etendue, as generally understood in the art, requires an optical system having a large emission area to achieve a narrow (collimated) angular light distribution. In the case of parabolic reflectors, a large optic is thus generally required to achieve high levels of collimation. In order to achieve a large emission area in a more compact design, the prior art has relied on the use of Fresnel lenses, which utilize refractive optical surfaces to direct and collimate the light. Fresnel lenses, however, are generally planar in nature, and are therefore not well suited to re-directing high-angle light emitted by the source, leading to a loss in optical efficiency. In contrast, in the present invention, light is coupled into the optic, where primarily TIR is used for re-direction and collimation. This coupling allows the full range of angular emission from the source, including high-angle light, to be re-directed and collimated, resulting in higher optical efficiency in a more compact form factor.

In at least some of the present embodiments, the distribution and direction of light within the waveguide is better known, and hence, light is controlled and extracted in a more controlled fashion. In standard optical waveguides, light bounces back and forth through the waveguide. In the present embodiments, light is extracted as much as possible over one pass through the waveguide to minimize losses.

In some embodiments, one may wish to control the light rays such that at least some of the rays are collimated, but in the same or other embodiments, one may also wish to control other or all of the light rays to increase the angular dispersion thereof so that such light is not collimated. In some embodiments, one might wish to collimate to narrow ranges, while in other cases, one might wish to undertake the opposite.

As in the present embodiments, a waveguide may include various combinations of mixing features, extraction features, and redirection features necessary to produce a desired light distribution. A lighting system may be designed without constraint due to color mixing requirements, the need for uniformity of color and brightness, and other limits that might otherwise result from the use of a specific light source. Further, the light transport aspect of a waveguide allows for the use of various form factors, sizes, materials, and other design choices. The design options for a lighting system utilizing a waveguide as described herein are not limited to any specific application and/or a specific light source.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure

We claim:

1. A luminaire, comprising:
a plurality of optical waveguides disposed in side-by-side relationship and together at least partially defining a closed path, each optical waveguide comprising a body of optically transmissive material extending from a first end to a second end opposite the first end;
a plurality of optical coupling portions disposed along the first end of adjacent optical waveguides, wherein each coupling portion comprises a refractive portion and a pair of reflective portions disposed on opposite sides of the refractive portion; and
at least one LED associated with each optical coupling portion and disposed to direct light towards each associated optical coupling portion, wherein the reflective portions and the refractive portion directs the light into the first end toward the second end of the optical waveguide.

2. The luminaire of claim 1, wherein the optical waveguides are disposed in a main frame.

3. The luminaire of claim 1, wherein each waveguide further comprises a light emitting portion which comprises a plurality of light extraction features.

4. The luminaire of claim 1, further comprising a sensor and a driver circuit responsive to the sensor for operating the LEDs.

5. The luminaire of claim 1, wherein each optical waveguide comprises an end adjacent to the optical coupling portion and an end opposite the optical coupling portion and each optical waveguide comprises one or more protrusions disposed at the end opposite the optical coupling portion.

6. The luminaire of claim 1, wherein the optical waveguides comprise at least substantially identical dimensions.

7. A luminaire, comprising:
a main frame comprising a first surface and a second surface opposite the first surface;
a cover plate mounted on the first surface of the main frame, wherein an outer edge of the cover plate extends to the second surface of the main frame;
a plurality of waveguides disposed in the main frame wherein each optical waveguide comprises a body extending from a first waveguide end to a second waveguide end opposite the first waveguide end, a coupling portion disposed at the first waveguide end, and a light emitting portion disposed between the first and second waveguide ends, wherein at least one of the waveguides is disposed at an angle relative to at least one other waveguide, and wherein the coupling portions of the waveguides are disposed adjacent a first luminaire end and the second waveguide ends are disposed adjacent a second luminaire end opposite the first luminaire end; and
at least one LED associated with and disposed to direct light into each optical coupling portion of each waveguide, the coupling portion comprising a reflective portion and a refractive portion to direct light produced by the at least one LED into the first waveguide end towards the second waveguide end.

8. The luminaire of claim 7, wherein each coupling portion comprises a refracting portion and at least two reflecting portions.

9. The luminaire of claim 8, wherein the light emitting portion of each optical waveguide comprises a plurality of light extraction features.

10. The luminaire of claim 9, wherein the light extraction features are clustered into two or more groups of similar light extraction features.

11. The luminaire of claim 7, further comprising a printed circuit board interconnecting the LEDs.

12. The luminaire of claim 7, wherein the cover plate mounted on the main frame overhangs the main body.

13. A luminaire, comprising:
a frame comprising a first surface and a second surface opposite the first surface, wherein the frame forms at least one channeled receptacle;
at least one waveguide disposed in the channeled receptacle comprising a body extending from a first waveguide end to a second waveguide end opposite the first waveguide end, an optical coupling portion disposed at the first waveguide end comprising a refractive portion and a pair of reflective portions disposed on opposite sides of the refractive portion to direct light produced by a light source into the first end toward the second end, and a light emitting portion disposed between the first and second waveguide ends, and
at least one LED associated with the at least one waveguide;
wherein the optical coupling portion is disposed adjacent to the at least one waveguide; and
wherein the optical coupling portion of the waveguide is disposed adjacent a first luminaire end and the second waveguide end is disposed adjacent a second luminaire end opposite the first luminaire end.

14. The luminaire of claim 13, wherein the light emitting portion of the at least one waveguide comprises a plurality of light extraction features.

15. The luminaire of claim 14, wherein the light extraction features are clustered into two or more groups of similar light extraction features.

16. The luminaire of claim 15, wherein the two or more groups of light extraction features are clustered according to a similar dimension.

17. The luminaire of claim 13, wherein the optical coupling portion comprises a refractive portion and at least two reflective portions disposed on opposite sides of the refractive portion.

18. The luminaire of claim 13, wherein a central enclosure is disposed within the frame;
wherein a cover encloses the central enclosure; and
wherein the cover sinks heat from the at least one LED.

19. The luminaire of claim 13, further comprising at least one circuit element disposed adjacent the optical coupling portion between the first and second surfaces of the frame.

* * * * *